Dec. 4, 1962 G. BECKER 3,066,861
CHANGE-COMPUTING CASH REGISTER
Filed Feb. 3, 1961 17 Sheets-Sheet 1

Dec. 4, 1962 G. BECKER 3,066,861
CHANGE-COMPUTING CASH REGISTER
Filed Feb. 3, 1961 17 Sheets-Sheet 2

Dec. 4, 1962  G. BECKER  3,066,861
CHANGE-COMPUTING CASH REGISTER
Filed Feb. 3, 1961  17 Sheets-Sheet 3

Dec. 4, 1962 G. BECKER 3,066,861
CHANGE-COMPUTING CASH REGISTER
Filed Feb. 3, 1961 17 Sheets-Sheet 7

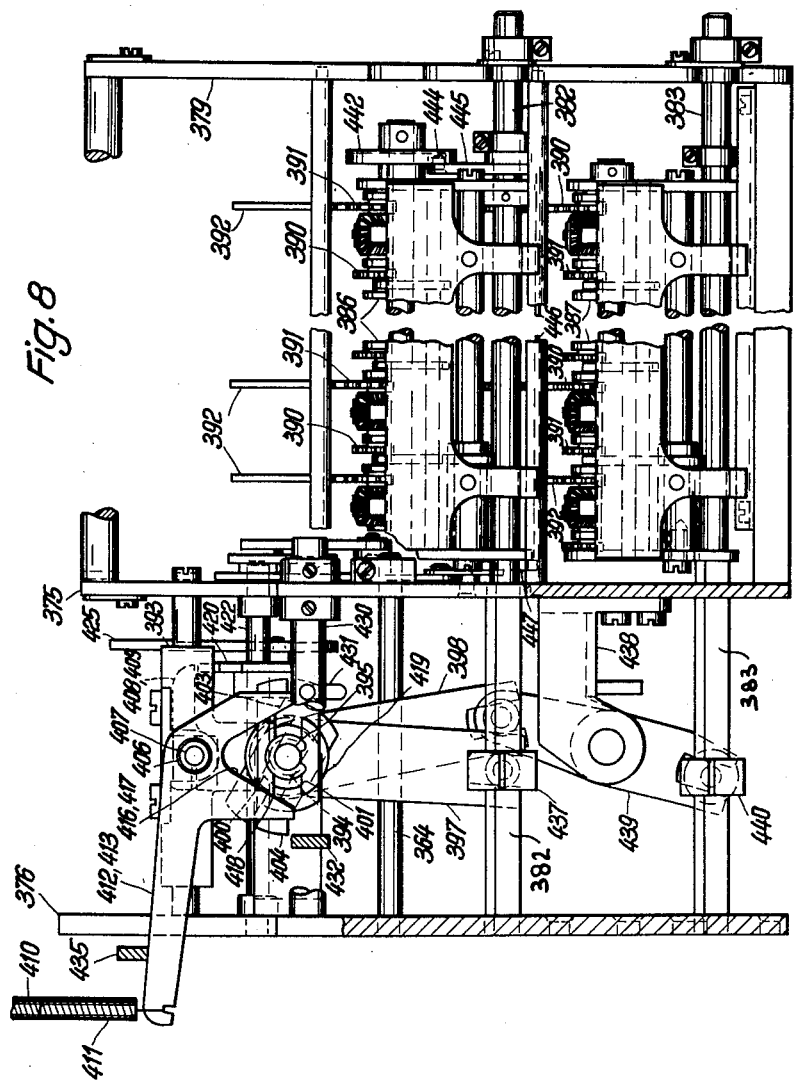

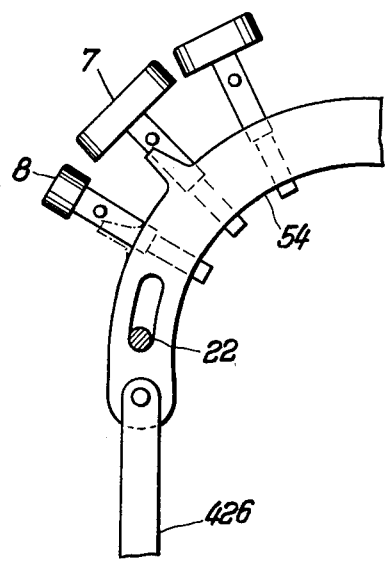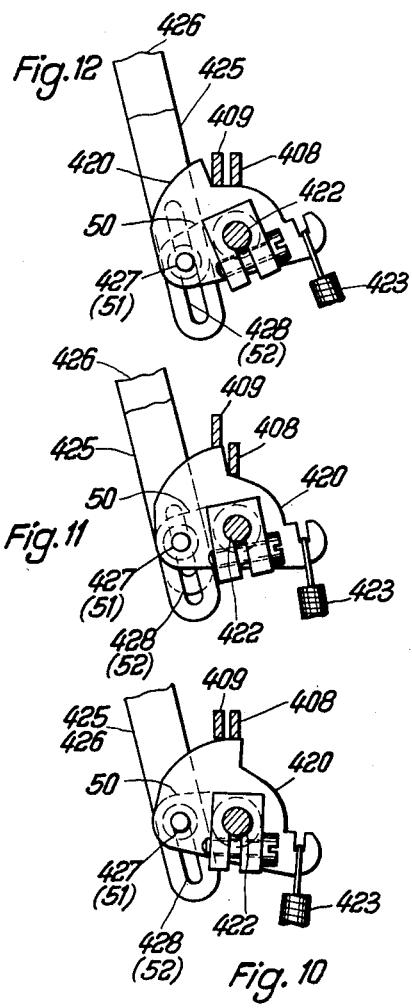

Dec. 4, 1962  G. BECKER  3,066,861
CHANGE-COMPUTING CASH REGISTER
Filed Feb. 3, 1961  17 Sheets-Sheet 10

Dec. 4, 1962 G. BECKER 3,066,861
CHANGE-COMPUTING CASH REGISTER
Filed Feb. 3, 1961 17 Sheets-Sheet 11
Fig. 15 (C-D)
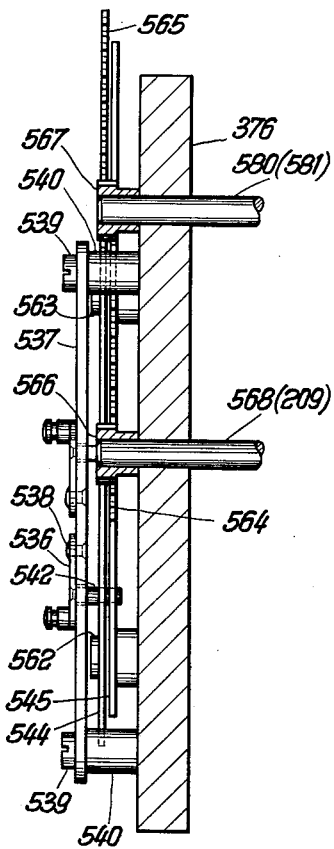
Fig. 14 (A-B)
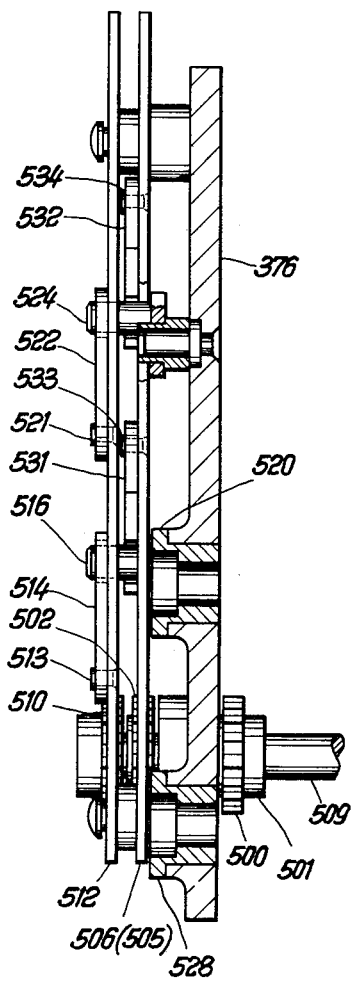

Dec. 4, 1962   G. BECKER   3,066,861
CHANGE-COMPUTING CASH REGISTER
Filed Feb. 3, 1961   17 Sheets-Sheet 12

```
00,99  MT*
02,50  GR *
00,35  GR *
03,84  St 10,00  PD –

6,16  CH –
```

```
00,99  MT *
02,50  GR *
00,35  GR *
03,84  St
03,84  Su
```

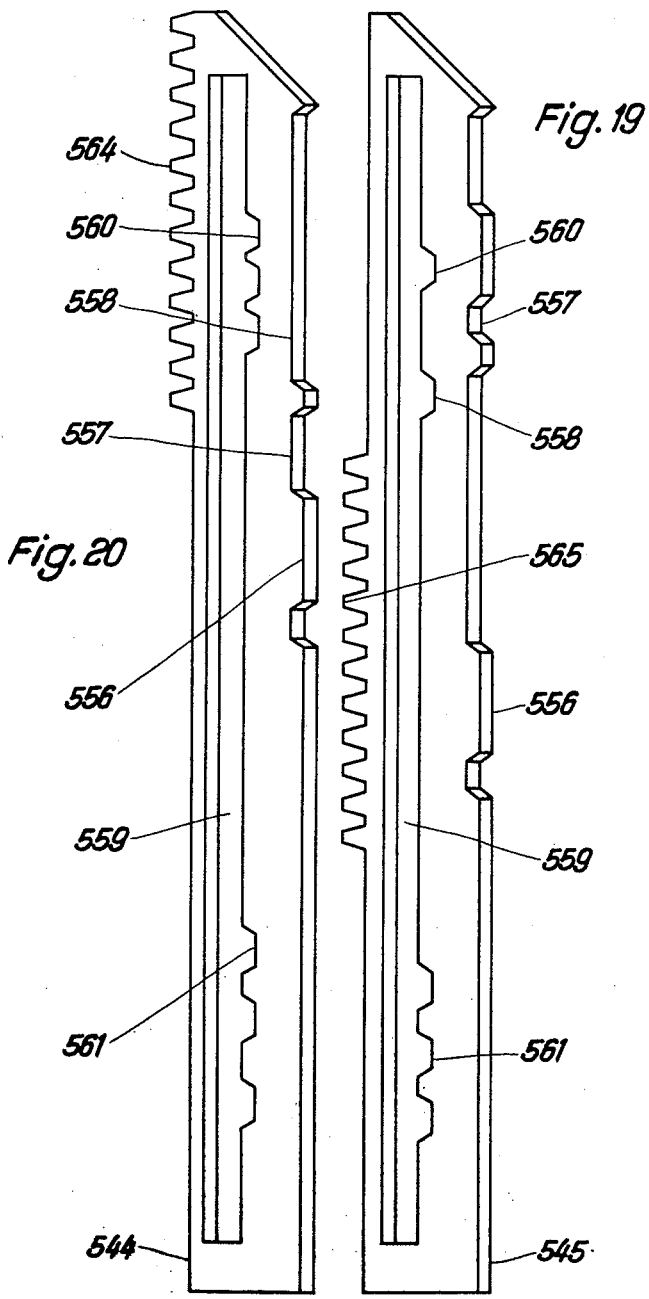

Dec. 4, 1962  G. BECKER  3,066,861
CHANGE-COMPUTING CASH REGISTER
Filed Feb. 3, 1961  17 Sheets-Sheet 14

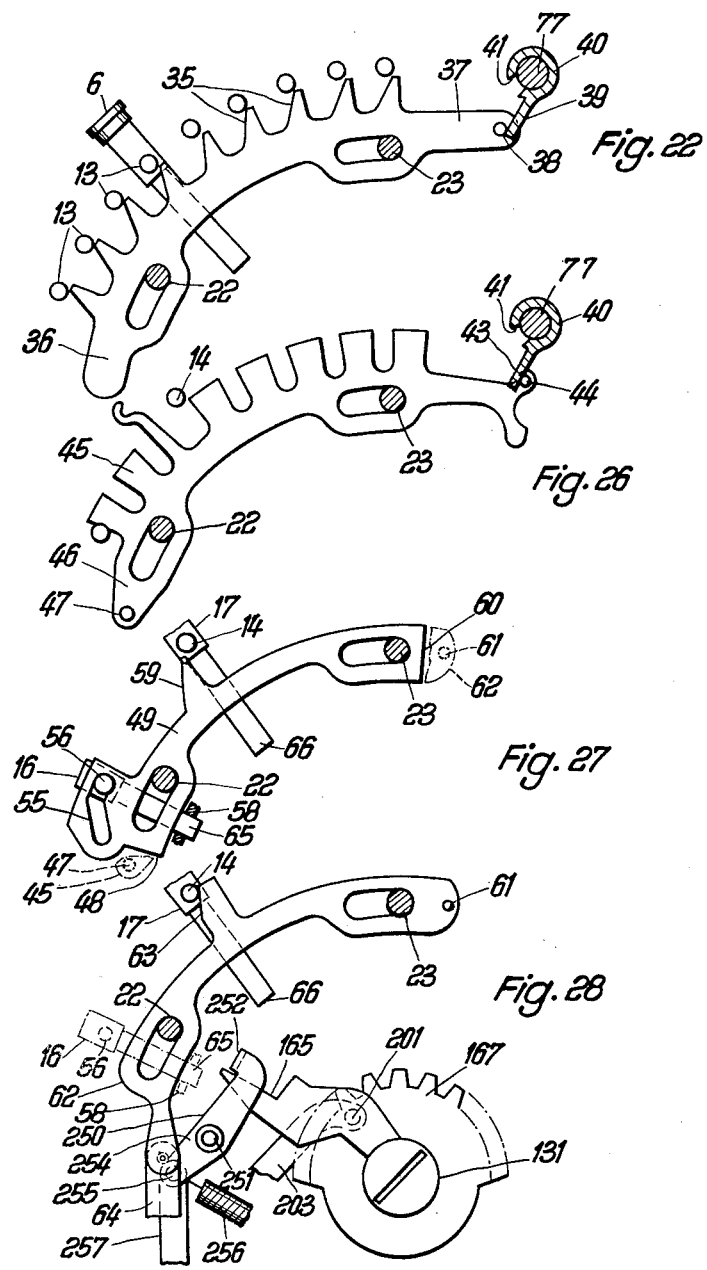

Dec. 4, 1962 G. BECKER 3,066,861
CHANGE-COMPUTING CASH REGISTER
Filed Feb. 3, 1961 17 Sheets-Sheet 16
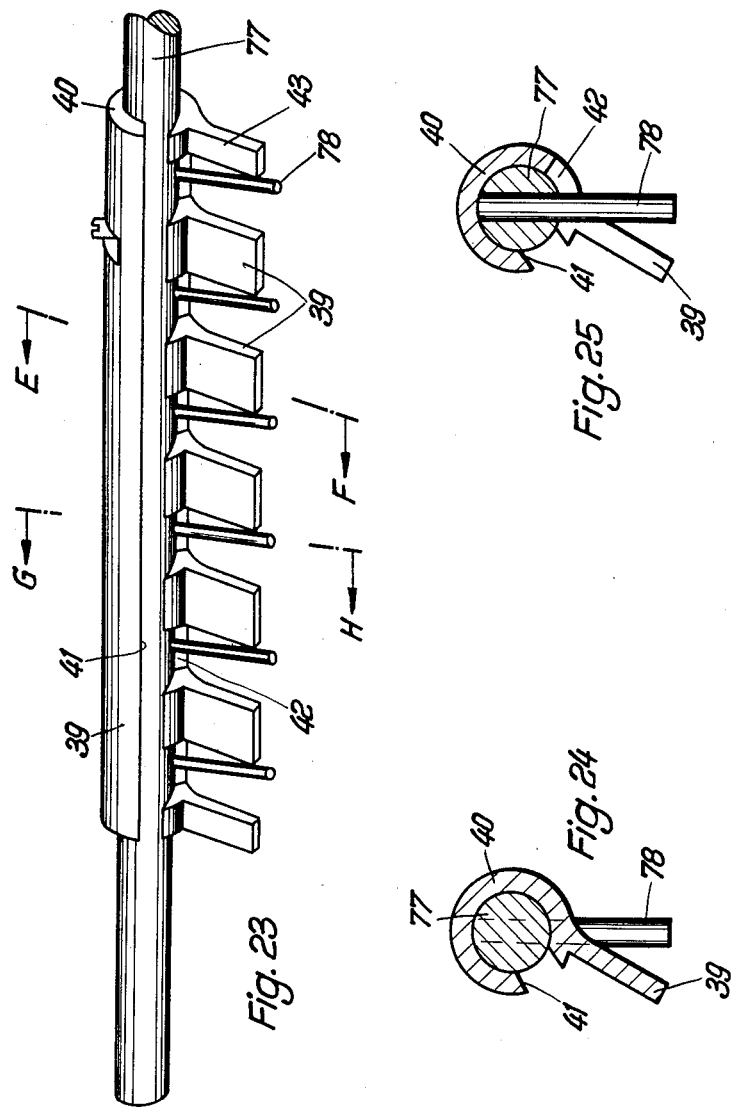

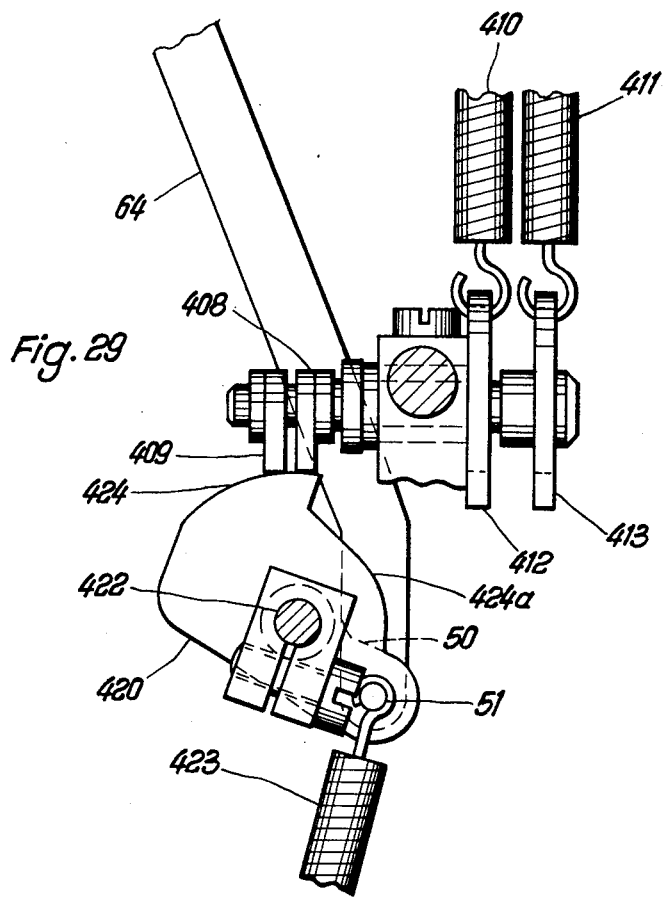

3,066,861
Patented Dec. 4, 1962

3,066,861
CHANGE-COMPUTING CASH REGISTER
Gerhard Becker, Bielefeld, Germany, assignor to Anker-Werke Aktiengesellschaft, Bielefeld, Germany, a corporation of Germany
Filed Feb. 3, 1961, Ser. No. 86,878
Claims priority, application Germany Feb. 6, 1960
20 Claims. (Cl. 235—2)

My invention relates to cash registers that compute, indicate and print amounts of change as constituted by the difference between the amount due and the amount tendered.

In a known change-computing cash register the machine-run releasing keys whose actuation causes entering the posted amount tendered and computing its difference from the amount due, are mutually interlocked to secure the proper constrained sequence of registering operations. These operations, for example, comprise entering of posted transaction items, totalizing the entered items, entering the amount tendered by the customer, and determining the amount of change as the difference between the amount totalized and the amount tendered.

The interlocking mechanism for the many keys and levers in such a machine is comparatively complicated, susceptible to trouble, and expensive. Undesirably much attention is required of the attendant personnel because it is inevitable in rush-hour business that one may attempt to depress a wrong release key which, being blocked, cannot be actuated so that the attendant must consider whether another release key is to be depressed, whether the amount tendered is sufficient, or whether perhaps the machine is defective.

It is an object of my invention to obviate or greatly minimize such shortcomings. More specifically, it is an object of the invention to simplify the keyboard and control devices of change-computing cash registers and to thereby also simplify the requirements put upon the attention of the attendant personnel.

My invention is based upon a cash register of the known type in which a "total" key, when depressed causes totalization of previously entered transaction items, and in which a computing device effects indicating and printing an amount of change as the difference between the totalized positive amount due from the customer and the posted and negatively entered amount of payment made by the customer. Relating to such change-computing cash registers, and in accordance with a feature of my invention, I provide one and the same control key for not only releasing a totalizing machine run to indicate the amount due, but for also releasing a change-computing machine run to form the difference between the amounts entered into the machine as positive or negative entries. I further provided the machine with control means that are connected with the computer mechanisms of the machine and are controlled by the one control key above mentioned to differently operate the computer mechanism as regards side selection (positive or negative adding performance) and mode selection (drawing a subtotal as the amount due, and drawing a total or ultimate balance as indicative of the amount of change).

Such a control of the change-computing mechanism permits the attendant to release a totalizing run by always depressing one and the same control key, regardless of whether the machine run to be released serves to draw a total of a multiple-item transaction or to draw an ultimate balance, i.e. the amount of change to be returned to the customer, and regardless of whether the amount tendered by the customer and posted into the machine is equal to, or larger than, the totalized amount due.

It is another object of the invention to further simplify the operation of the change-computing cash register in the event of a transaction where the amount tendered is equal to the totalized amount of the entered items. To this end, and in accordance with another feature of my invention, I provide the machine with means that afford terminating the registering operation by depressing, immediately after drawing the subtotal of the transaction, a sum (total) key without the necessity of first posting the tendered amount into the machine. This facilitates the attendant's activities and expedites serving the customer. With such a machine, depending upon the circumstances of a particular transaction, a number of multiple-item entering runs of the machine can be terminated directly by depressing the ultimate sum (total) key as in conventional cash registers without change-computing devices; or—when the customer tenders a larger amount than the one due—machine performance can first be continued by posting and entering the amount tendered before obtaining the change computation by again depressing the same ultimate total key.

For further simplification of the control-key field of change-computing cash registers and their control devices, and in accordance with another feature of my invention, I provide not only a single control key for releasing different (subtotalizing, totalizing or change-computing) machine runs, but I also let the same key serve for controlling further machine runs, namely amount-entering, subtotalizing and totalizing runs, in dependence upon the (positive or negative) position of the add-sub mechanism and in dependence upon the setting of the amount-posting keys.

According to still another feature of the invention, the cash register is provided with identifying means which differently identify, by indication and printing, the various amounts drawn from the computing mechanisms, one and the same control key being always used for releasing such totalizing and identifying operations.

The foregoing and other objects, advantages and features, said features being more specifically set forth in the claims annexed hereto, will be apparent from, and will be further explained in, the following description of the embodiments of the invention illustrated by way of example on the accompanying drawings in which:

FIG. 8 is a rear view of the change-computer assembly.

FIG. 9 shows a detail of the mode-control devices.

FIGS. 10, 11 and 12 illustrate details of the computer-side selector device according to FIGS. 7 and 8.

FIG. 14 is a cross section along the line A—B in FIG. 13.

FIG. 15 is a cross section along the line C—D in FIG. 13.

FIGS. 19 and 20 are perspective views of slide members that form part of the computer mechanism of FIGS 13 to 15.

Figure 21:
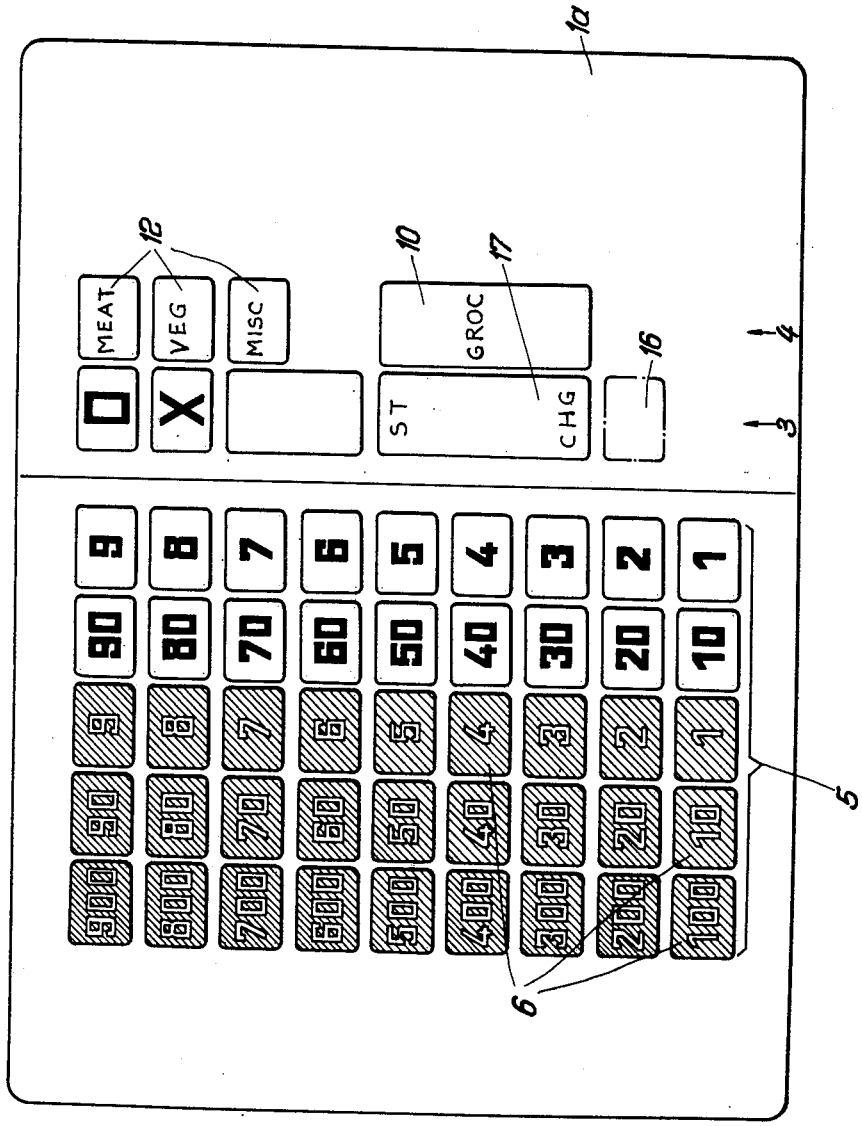

FIGS. 21 to 30 relate to another embodiment, FIG. 21 being a top view of the keyboard of the machine.

FIG. 22 is a side view of one of the amount-control sliders of the machine.

FIG. 23 shows in perspective the control and resetting shaft of the machine.

FIG. 24 is a cross section along the line E—F in FIG. 23.

FIG. 25 is a cross section along the line G—H in FIG. 23.

FIG. 26 shows another control slider in a lateral view.

FIG. 27 is a lateral view of still another control slider.

FIG. 28 is a lateral view onto the feeler device of the mode-control key bank.

FIG. 29 illustrates a portion of the plus-minum selector device for the change computer.

FIG. 30 shows an example of a check issued by the machine according to FIGS. 21 to 29.

While the invention is not limited to any particular make or model of change-computing business machines, the machines shown on the drawings and described below are generally in accordance with known change-computing cash registers made and sold by Anker-Werke A.G., Bielefeld, Germany. With respect to certain component subassemblies, such as the keyboard assembly, the transfer mechanisms (also called differential mechanisms), adding-subtracting change computers (add-sub mechanism), indicating devices, check-printing and issuing devices and cash-drawer mechanisms, the cash registers described herein embody features and subassemblies known from, or previously disclosed in, Patents No. 2,579,535, No. 2,690,-710, No. 2,650,023, No. 2,784,666, and applications Serial No. 635,713, filed January 23, 1957 by G. Becker et al., Serial No. 24,485, filed April 25, 1960 by G. Becker et al., Serial No. 24,486, filed April 25, 1960 by G. Becker, Serial No. 67,438, filed November 4, 1960 by G. Becker. Nevertheless, many of these known components, some of them modified for the purposes of the present invention, are also shown on the accompanying drawings and are described below because they are necessary in conjunction with the present invention or forming part of its immediate environment.

The cash register according to FIGS. 1 through 20 is of a type commonly employed in stores. It is equipped with a keyboard 1 whose base plate forms part of the machine housing 2 (FIG. 1), counting and calculating mechanisms, a mechanism for printing sales checks and issuing them through an opening 2a, a cash drawer 2b which opens automatically upon completion of a machine run or depression of a "NO SALE" key. Also provided is an indicator 2c on which the posted and registered amounts are visible. The working parts of the cash register, enclosed in the housing and partly located beneath the keyboard 1, are actuated under control by the particular keys depressed by the cashier or salesman in accordance with the business transaction to be registered. For this purpose, the keyboard 1 comprises an amount-posting portion 5 (FIGS, 1, 2) with a decimal group of amount keys 6 arranged in a plurality of vertical key banks for the respective digits. The keyboard 1 further comprises a bank 3 for selectively controlling the desired mode of operation. Another key bank 4 permits the selection of adding mechanisms. The keys in this bank control the entering of individual posted amounts into selected special totalizers for classes of goods or services sold. In the illustrated cash register there are special totalizers for sales of meat, vegetables, or miscellaneous, selected by depression of one of three keys 12, as well as a key 10 for entering sales in the grocery department. Bank 4 also comprises a "PAID" key 11. The amount of cash handed over or tendered by a customer is entered and registered when the key 11 is depressed after the cash amount is posted by depressing the proper keys 6 of the amount key banks 5.

The mode-of-operation control bank 3 comprises a "NO SALE" key "0," a "SUM" key 7 and a "SUBTOTAL" key 8. The keys in banks 3 and 4 are motorized. That is, the depression of any one of them releases a machine run.

The keys in each individual bank are mutually interlocked so that only one of them can be depressed at a time and is released to return to its inactive position when another key in the same bank is being actuated. The keys 6 to 12 in banks 3, 4 and 5 have their respective shanks provided with a cross pin, such as the one shown at 13 in FIG. 3, which acts upon a latching slider 20 assigned to the particular bank. The slider 20 is biased by a spring 21 and is guided by pin-and-slot guides 22, 23 so as to be displaceable in the alignment direction of the bank. The banks 3 and 4 are further provided with a transfer slider 24 which has a recess 26 engaged by a pusher rod 25 connected with a conventional blocking device 80.

Figure 3:
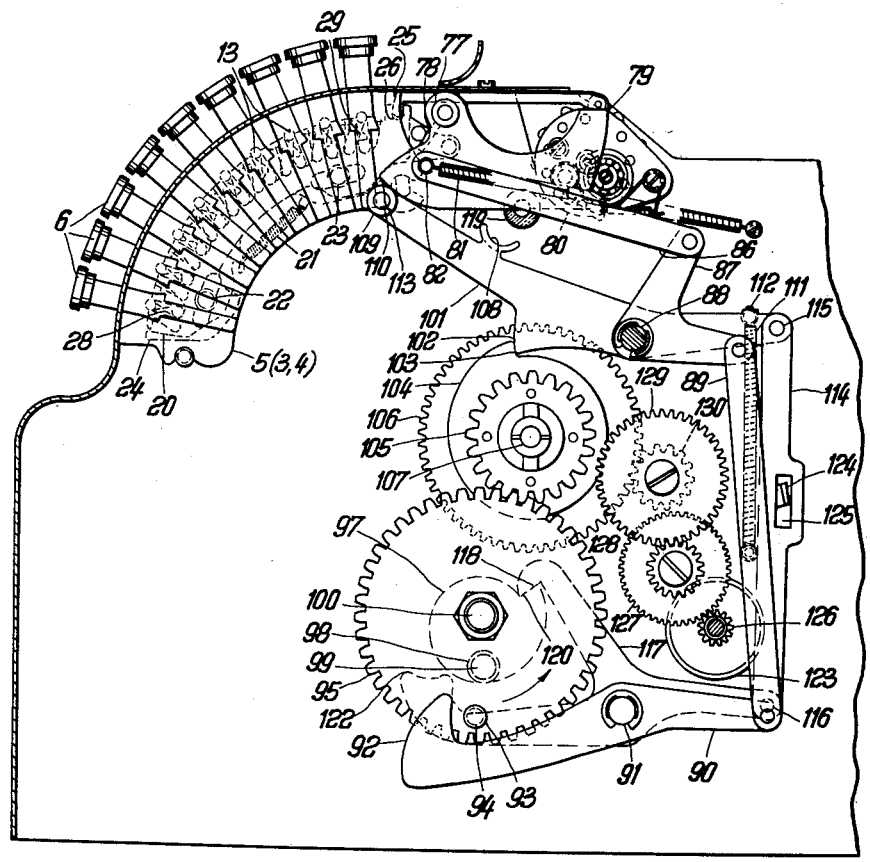
FIG. 3 shows a bank of amount-posting keys in a lateral view together with a partly sectional view of the devices of the machine.
Figure 4:
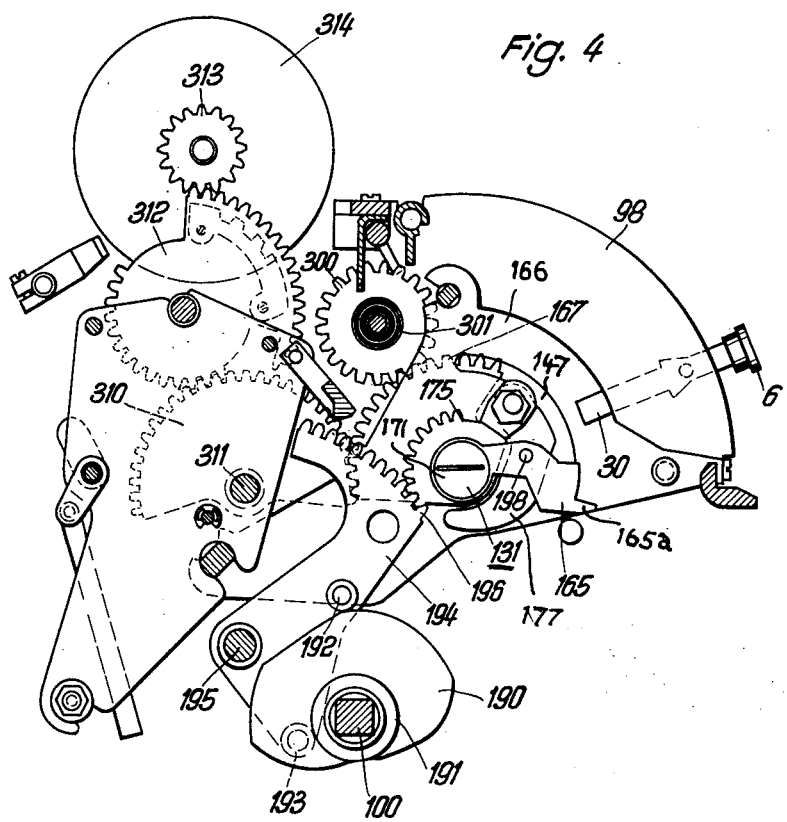
FIG. 4 is a partly sectional side view of the indicating and printing mechanisms of the machine.

Located between the key banks 3, 4, 5 and the blocking device 80 is the machine-run release shaft 77 (FIG. 3). Shaft 77 carries pins 78 which cooperate with the respective latching sliders 20 of the individual key banks 3, 4, 5. The release shaft 77 further carries a cam disc 79 which cooperates with the blocking device 80 and controls the release of the machine. The two sliders 20 and 24 for each key bank have inclined edges 28, 29 acted upon by the cross pins 13 of the respective keys 6 to 12.

Pivotally jointed with a pin 82 of the control cam 79 is a pusher rod 86 which connects the cam disc 79 with an angular lever 87 pivoted on a pin 88. Another pusher rod 89 connects the lever 87 with a release-control lever 90 rotatable about a pivot pin 91. The release lever 90 has a hook-shaped cam portion 92 which cooperates with a cam roller 93 journalled on a pin 94 that is fastened to a spur gear 95. The spur gear 95 is fastened on the main drive shaft 100 (FIGS. 3, 4, 6) of the machine and is rigidly and coaxially joined with a cam 97 (FIG. 3). Cam 97 carries a pivot pin 99 on which another roller 98 is revolvable.

The above-mentioned pivot pin 88 for the angular lever 87 also carries a rotatable latching lever 101 which has a detent projection 102 engaging a catch of a slip clutch 104. The clutch elastically or yieldingly connects a spur gear 105 with another spur gear 106. Gears 105, 106 and clutch 104 are coaxially mounted on a common shaft 107.

The detent lever 101 is further provided with a semi-circular stop 108 and a cam-follower roller 109 rotatable on a journalling pin 110. A spring 111 fastened to the clutch detent lever 101 by means of a hook 112, tends to turn the detent lever 101 clockwise, but this is normally prevented by a lobe of cam 79 engaged by the roller 109. A linking rod 114 with respective pivot pins 115 and 116 at its ends, joins the detent lever 101 with a three-arm control lever 117 pivotally mounted on the above-mentioned pivot pin 91 of the release-control lever 90. The control lever 117 has a latch arm 118 catching behind a shoulder 120 of the cam disc 97. Another arm 122 of lever 117 is located in the action range of the roller 98 journalled on cam 97.

The main shaft 100 of the machine is driven from an electric motor 123 (FIG. 3). The electric circuit of the motor 123 (not shown) is switched on and off by a switch whose actuating member 124 has a lug protruding through a slot 125 in linking rod 114. Shifting motion of the linking rod 114 in the upward and downward direction actuates the switch, thus turning the electric motor 123 on and off. The motor has a pinion 126 which drives the main shaft 100 (FIGS. 3, 4, 6) counterclockwise with respect to FIG. 3 through a train of speed reduction gears 127, 128, 129, 130, 106, 105 and 95.

As soon as a machine run is to be released by actuation of one of the mode-control or adding-mechanism selector keys 7 to 12, the blocking device 80 releases the cam disc 79 in the known manner. The spring 81 then turns the cam disc 79 counterclockwise (FIG. 3) and thereby turns the release control shaft 77 in the counterclockwise direction. Then the pins 78 place all latching sliders 20 to the latching position. While the cam disc 79 is turning counterclockwise, the pusher rod 86 turns the angular lever 87 clockwise. The motion of lever 87 is transmitted by the linking rod 89 to the release-control lever 90 and turns it clockwise about its pivot 91, thus placing the hook-shaped portion 92 into active position. Furthermore, the spring 111 abruptly shifts the clutch detent lever 101 out of catch 103 of clutch 104, since the lobe 113 of cam disc 79 no longer retains the detent lever 101. The semicircular stop 108 on top of the detent lever 101 abuts against a stop 119, and the roller 109 catches behind the lobe 113 of cam 79 in order to prevent returning motion of the cam.

Now the clutch 104 is active. The linking rod 114 transmits the displacing motion of the clutch detent lever 101 to the control lever 117 and, by means of the slot 125 and the lug on the switch-actuating member 124, simultaneously closes the energizing circuit for the electric motor 123. The control lever 117 turns clockwise about pivot 91 so that the arm 118 releases the main drive shaft 100 for rotation, whereas the arm 122 of control lever 117 shifts to its active position. Now the motor 123, acting through the spur gears 127 to 130, 105, 106, 95, drives the main drive shaft 100 counterclockwise a full revolution in order to perform a machine run.

When the main drive shaft 100 has nearly completed a full turn, the roller 98 hits against the arm 122 of control lever 117 and turns it counterclockwise about pivot 91 so that the arm 118 approaches the cam disc 97 sufficiently to have the cam shoulder 120 abut against the latch arm 118. This stops the cam 97. Simultaneously, the linking rod 114 transmits the counterclockwise rotation of control lever 117 to the clutch detent lever 101 while tensioning the spring 111. The detent lever 101 is thus turned back to the latching position, and the roller 109 moves out of the range of engagement with cam 79. The main drive shaft 100, at this moment, continues to be driven, although the slot 125 in link 114 has relased the switch-actuating lug 124. As soon as the roller 93 reaches the latch portion 92 of the control lever 90, it turns the control lever 90 counterclockwise. The cam 79 is turned back clockwise by transmission members 89, 87, 86 to such an extent that the release-control shaft 77 causes its pins 78 to shift the latching slider 20 to the left, thus releasing the previously depressed keys 6 to 12.

The shanks 30 of the amount keys 6 (FIG. 4) act upon transfer (differential) mechanisms 131, one such mechanism being provided for each of the respective digital key banks. The operation of each transfer mechanism is then controlled in dependence upon which particular amount key 6 (FIG. 4) in the bank is depressed at a time, for the purpose of entering and registering a digital value corresponding to the one designated by the depressed key. The value transferring control is effected by virtue of the fact that the lower end of the key shank 30, when the key is depressed and latched in depressed position, enters into the path of rotary motion of a stop arm 165 so that a nose 165a of the arm, during counterclockwise arm travel, can abut against the shank 30. As will be explained, this arrests the arm 165 in an angular position that depends upon which particular key 6 in the bank has been actuated. The stop arm 165 is driven from the main shaft 100 through a pair of cams 190, 191 which cooperate with respective rollers 192 and 193 of a feeler lever 194 pivotally rotatable about a shaft 195. The feeler lever 194 is provided with a gear segment 196 in meshing engagement with another gear segment 175 which forms part of the transfer mechanism and is joined, in a manner still to be described, with the stop arm 165, thus turning the stop arm clockwise about the axis of a journal bolt 171 until the nose 165a abuts against the shank 30 of the depressed key 6.

Figure 5:
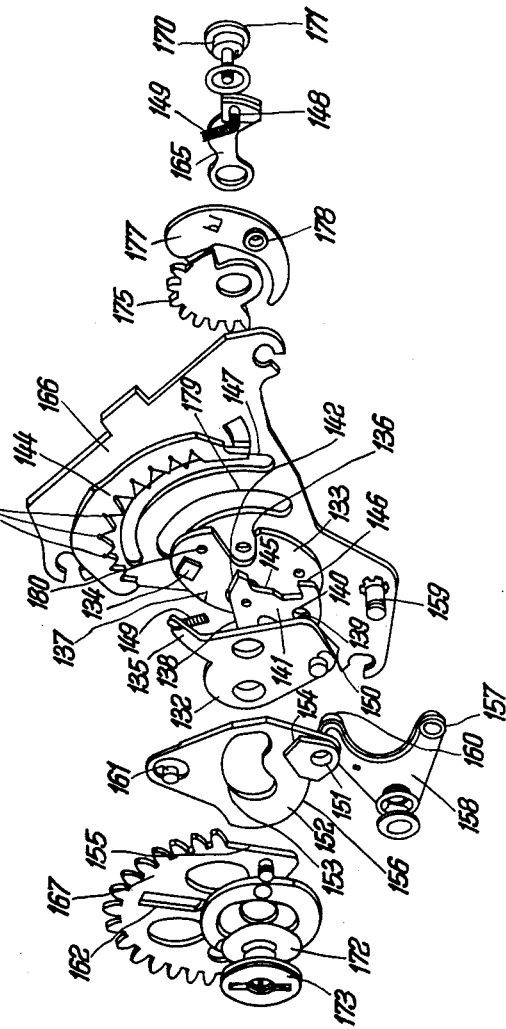
FIG. 5 is an exploded perspective view of one of the transfer (differential) mechanisms.
Figure 7:
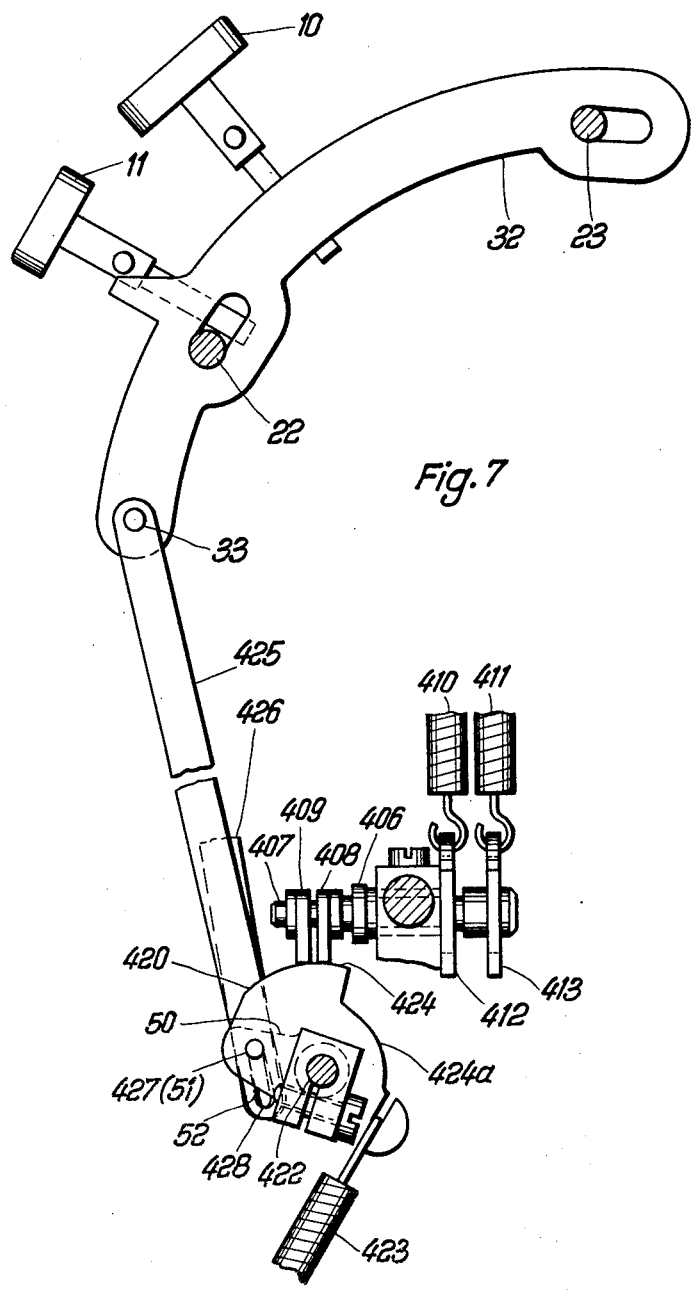
FIG. 7 shows partly in section the central device for selecting the positive and negative (additive and subtractive) sides of the change computer.

The design and operation of the transfer, or differential 131 (FIG. 4) will now be described in detail, mainly with reference to FIG. 5. The above-mentioned journal bolt 171 on which the stop arm 165 (FIG. 4) and the gear segment 175 (FIGS. 4, 5) are mounted, is fastened to a lateral wall 166 of the key-bank assembly by means of a nut 173 which has a guiding portion 172 (FIG. 5, extreme left). The stop arm 165 and the gear segment 175 are rotatably seated on a neck portion 170 of the bolt 171 (FIG. 7, extreme right). As described, the gear segment 175 meshes with a driving gear in order to impart a given amount of angular motion to the stop arm 165 of the transfer mechanism during each individual machine run. The gear segment 175 is firmly joined with a finger-shaped arm 177. Fastened to the arm 177 is a dog pin 178 which passes through an arcuate opening 179 of side wall 166 (FIGS. 5, 4) into a bore 180 (FIG. 5) of a control cam 133. The cam 133 is rotatably mounted on the journal bolt 171 together with a coaxial control member 132 and a coaxial gear segment 167.

The control cam 133 carries a rectangular stop lug 134 which cooperates with a finger-shaped lug 135 of the control member 132. The cam contour of cam 133 has a V-shaped recess 136 and a cam curve 137 which radially ascends from the axis of the journal bolt 171. The V-shaped recess 136 of control cam 133 straddles a guide member 138 of a latch pawl 141. The pawl 141 has a tapering extension 142 which can enter into catch recesses 143 of an arresting segment 144 fastened to the side wall 166. The extension 142 merges with a cam curve 145 bordered and limited by a latch hook 146. The hook 146 cooperates with a pin 148 (FIG. 5, right) which is fastened to the stop arm 165 and extends through another arcuate opening 147 in side wall 166.

The control member 132, carrying the pawl 141, is biased by a pull spring 149 (shown in two broken-apart parts) which is hung onto the lug 135 of control member 132 and connected with the pin 148 of the stop arm 165. The control member 132 further carries a bearing pin 160 which passes through a bore 151 of a cam segment 152. The cam segment 152 has an arcuate opening 153 and a stop 154 which acts upon the edge 155 of a gear segment 167. The segment 152 further has a cam curve 156 engaged by a roller 157. The roller 157 is journalled on a bifurcated latch lever 158 pivotally rotatable about a pin 159 of the side wall 166. The latch lever 158 carries another roller 160 in follower engagement with the above-mentioned cam curve 137. Fastened to the cam segment 152 is a pin 161 engaging a radial, rectangular slot 162 of gear segment 167. Mounted on the finger-shaped arm 177 is a pin 178 which passes through the arcuate opening 179 of side wall 156 and engages the bore 180 of the cam disc 133, this disc being likewise coaxially rotatable on the journal bolt 171.

Figure 1:
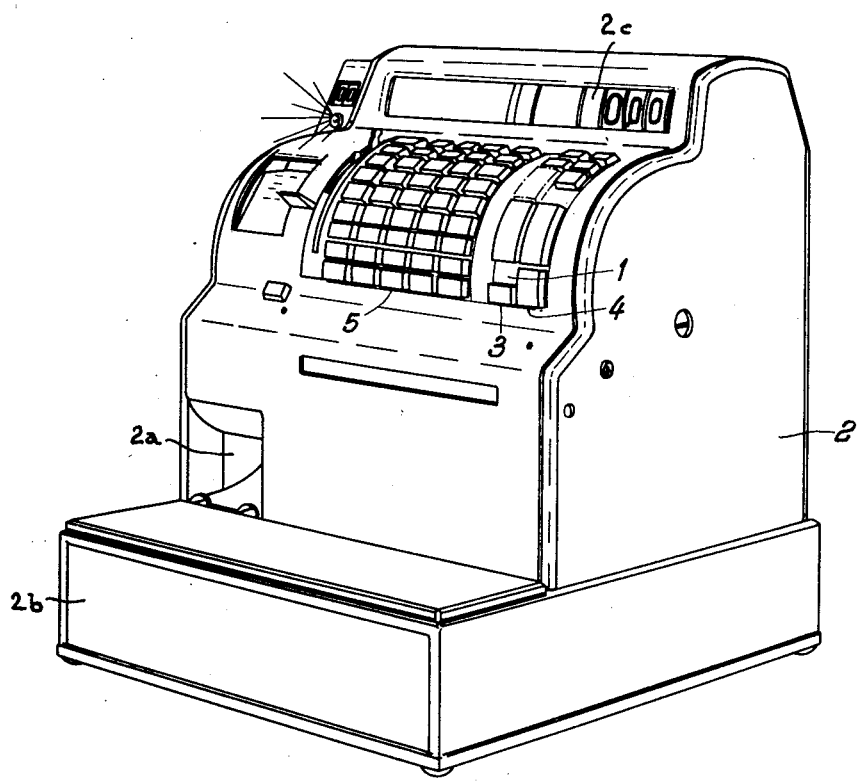
FIG. 1 is a perspective view of a change-computing cash register.
Figure 2:
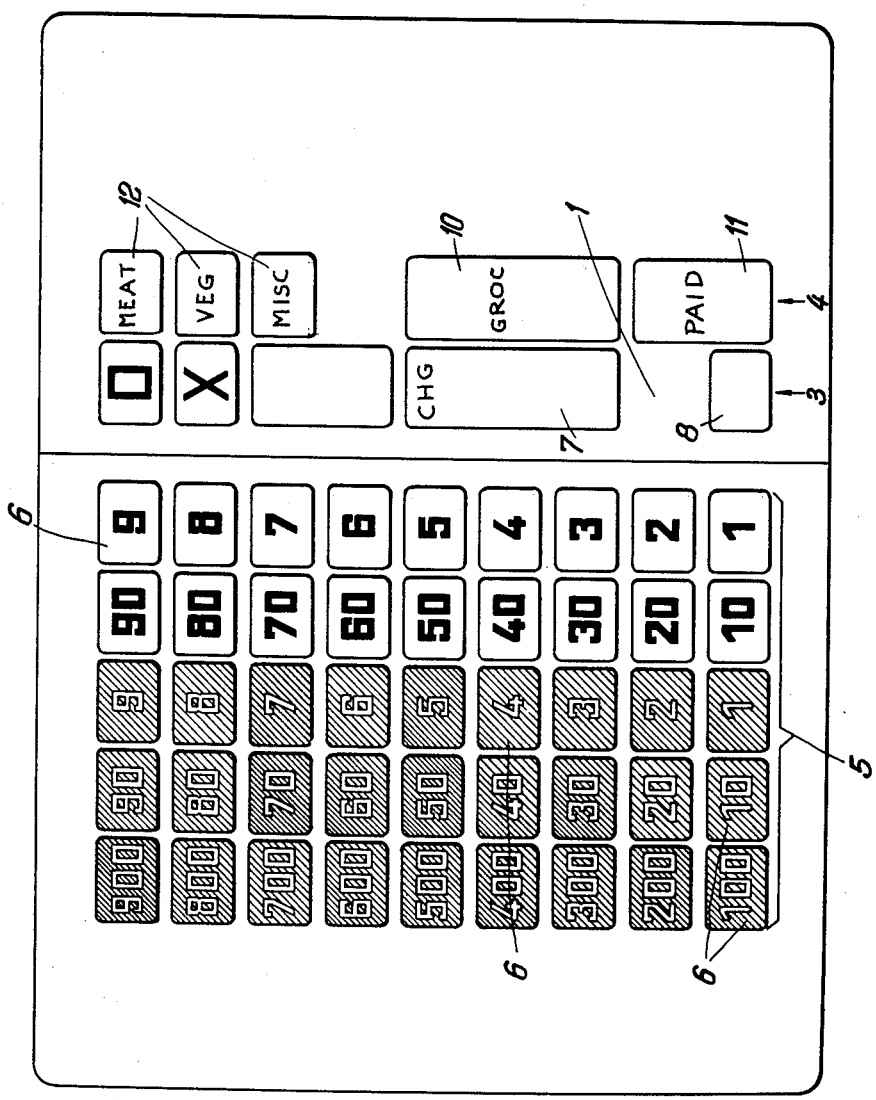
FIG. 2 is a top view of its keyboard.

The above-described transfer or differential mechanism commences its operation as soon as a machine run is initiated by depression of a control key in bank 3 (FIGS. 1, 2). During each such machine run the main control shaft 100 (FIGS. 3) performs a single full revolution. During such revolution, the gear segment 175 (FIGS. 4, 5) of the transfer mechanism is turned a given angle of rotation depending upon which particular amount key was previously depressed in the bank to which the transfer mechanism is assigned. Hence the amount of rotation of gear segment 175 is fixed for each run. Only when the machine run is completed, is the gear segment 175 reset to the starting position. In the meantime, the transfer mechanism has performed the operations described presently.

At the beginning of the machine run, the gear segment 175 acts through its dog pin 178 upon the control cam 133 and turns it counterclockwise (FIG. 5). The control member 132 is entrained in the same sense of rotation, due to the fact that the pawl, secured to the control member 132, has its guide portion 138 engaged in the V-shaped recess 136 of control cam 133. Due to the action of the pull spring 149 the stop arm 165 participates in the same counterclockwise motion. As soon as the stop arm 165 is arrested in the selected position by the shank 30 of the depressed amount key, the control member 132, entrained by pawl 141, tensions the pull spring 149. Then the hook 146 of pawl 141 passes over the dog pin 128 and thereby turns the pawl 141 clockwise about its pivot 139, 140 relative to the control member 132. During further rotation of member 132, the guide portion 138 of pawl 141 is moved out of the V-shaped recess of control cam 133, and the lug portion 142 of pawl 141 enters into one of the tooth recesses 143 of the arresting segment 144. This blocks the stop arm 165, as well as the parts 132, 141 connected therewith, in the position then reached, until the gear segment 175 has completed its counterclockwise driving motion.

The above-described gear segment 167 of the transfer mechanism meshes with gears (described below with reference to FIG. 4) which transmit its rotary motion to the printing devices and indicating devices of the cash register in order to set these devices in accordance with the amount posted into the machine. The gear segment 167 for transferring the posted data into the printing and indicating devices is driven by the pin 161 of the control cam 152, which pin passes through the radial slot 162 of segment 167.

For accurately adjusting the gear segment 167 which is biased clockwise by a spring (not illustrated), the gear segment 167 is blocked after it has reached the proper position. For this purpose, the control segment 152 has the above-mentioned stop 154 and cam contour 156. The cam curve 156 is engaged by the follower roller 160 of the latch lever 158 which blocks the gear segment 167 under the action of the cam curve 137 so as to reliably arrest the segment 167 in the position determined by that of the stop arm 165.

After the posted amounts are thus entered into the machine and any computing steps are completed, the gear segment 175 is returned to the starting position shortly before the termination of the machine run. During return travel, the blocking of the gear segment 167 by the latch lever 158 is released and, during further return motion of the control cam 133, the spring 149 pulls the guide member 138 of the pawl into the V-shaped recess 136 of control cam 133. This releases the stop arm 165, so that the arm can return to its starting position under the action of the gear segment 175.

The stop arm 165 (FIG. 4) of each of the transfer mechanisms 131 correlated to the individual banks 5 of amount keys carries a pivot pin 198 which is in engagement with a linking rod (omitted in FIG. 4 to prevent obscuring other parts) which connects the stop arm 165 with a spur-gear segment 392 (FIGS. 6, 8) on a shaft 208. The segments 392 of the respective transfer mechanisms transmit the angular setting of the respective stop arms 165 to the adding mechanisms (not shown) and to the change-computing mechanism 386, 387 (FIG. 8).

Figure 6:
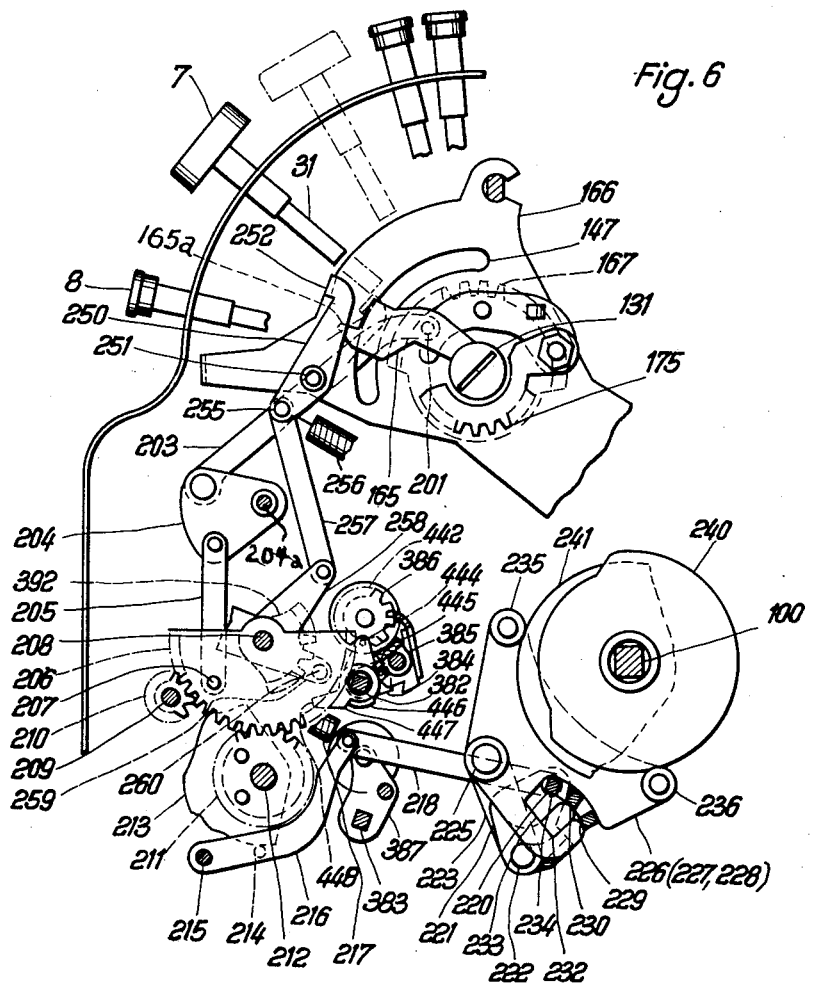
FIG. 6 is a partly sectional side view of the mode-controlling key bank and the control mechanisms controlled by the change computer.

(The just-mentioned pivot pin 198 corresponds to the pivot pin 61 in FIG. 5 of Serial No. 67,438; the linking rod corresponds to rod 64 in FIGS. 5 and 6 of Serial No. 67,438, and the gear segment corresponds to the one denoted by 67 in FIG. 6 of Serial No. 67,438. A similar linking-rod connection with the change computer is illustrated and described in Serial No. 635,713, FIG. 3 of the latter application being substantially identical with FIG. 8 of the present disclosure.)

In the transfer mechanism 131 correlated to the mode-of-operation key bank 3, a pin 201 of the gear segment 167 (FIG. 6) is connected to a link 203 which acts upon another link 205 through an arm structure 204 pivoted at 204a. The link 205 is pivotally connected by a pivot pin 207 to a gear segment 206. The gear segment 206 is journalled on the shaft 208 and meshes with a pinion 210 fastened to a control shaft 209. Segment 206 also meshes with a spur gear 211 on a shaft 212 which also carries a cam segment 213.

The contour of cam segment 213 acts upon a follower pin 214 mounted on a feeler lever 216. Lever 216 is pivoted on a pin 215 and biased by a pull spring 217 fastened to the machine frame structure. The feeler lever 216 is connected with a linking rod 218. The linking rod 218 is connected with a bolt 220 of square cross section which is fastened on a swing arm 221 rotatable on the pivot pin 222 of a lever 223. Lever 223 is connected with the operation-mode control shaft 225. The square bolt 220 cooperates with swing levers 226, 227, 228, which possess respective entrainers 229, 230, 231 and are provided with respective recesses 232, 233, so that the square bolt 220, depending upon its angular adjustment, will always connect only one of the swing levers 226 to 228 with the lever 223 or with the mode-control shaft 225, without being able to act upon the two other swing levers of the mode-control shaft 225. Each of the swing levers 226, 227, 228, rotatably seated on the mode-control shaft 225, carries two rollers 235 and 236. The rollers are driven from respective pairs of cam discs 240, 241, firmly secured to the main drive shaft 100.

The swing lever 226 serves for controlling the operating mode "addition." The swing lever 227 controls the mode "subtotalizing" (adding multiple-item transactions). The swing lever 228 controls the mode "totalizing" (balance or change computation).

Pivotally mounted on the above-mentioned lateral wall 166 (FIG. 6) of the machine frame structure by means of a pin 251 is a stop control member 250 which has a lateral lug 252 cooperating with the nose 165a of the stop arm 165. The stop control member 250 has a pin 255 engaged by a pull spring 256, as well as by a link 257 which is pivotally joined with one arm of an angular lever 258 on the shaft 208 of the above-mentioned gear segment 392. The other arm 259 (FIG. 6) of angular lever 258 carries a dog pin 260 for coaction with the change computer, as will be described further below.

The gear segments 167 (FIGS. 5, 6) of the respective transfer mechanisms 131, controlled by the shanks 30 (FIG. 4) of the amount keys, are in meshing engagement with respective spur gears 300 (FIG. 4) which are mounted on respective coaxial tubular shafts 301 and are thereby connected with the printer type wheels (not illustrated) of the machine in the known manner (U.S. Patents 2,579,535 and 2,690,710). The gear segment 167 of each transfer mechanism 131 also meshes with another gear segment 310 journalled on a shaft 311 and in mesh with a twin segment 312. The twin segment 312 serves to rotate a spur gear 313 which forms part of the indicating device 314 (located at 2c in FIG. 1) of the cash register.

The above-mentioned "PAID" key 11 (FIGS. 2, 7) in the adding-mechanism selector bank 4 cooperates with a key slider 32 which is mounted and guided on the frame structure by means of pin-and-slot connections 22, 23. The slider 32 has a pin 33 engaged by the upper end of a linking rod 425. A slot 428 at the lower end of rod 425 is engaged by a pin 427 on a selector cam 420 (FIGS. 7, 8). The selector cam 420 is fastened on a control shaft 422 and biased by a pull spring 423. The cam contour of the selector cam 420 has an arcuate lobe 424 and an arcuate recess 424a for cooperation with two cam feelers 408, 409 (FIGS. 7, 8,). The feelers 408 and 409 are connected with respective switching levers 412, 413 by a sleeve 406 and by a shaft 407 passing through the sleeve.

The levers 412 and 413, biased by respective pull springs 410 and 411, serve to effect a selection of the plus or minus side of the change-computing mechanisms 386, 387 in a manner more fully described below. Also fastened on control shaft 422 (FIG. 7) is an arm 50 with a pin 51 engaging a slot 52 in a linking rod 426. The linking rod 426 is connected with a slider 54 (FIG. 9) which is mounted in the assembly of the operation-control bank 3 and controlled by the "SUM" key 7.

Illustrated in FIGS. 10 to 12 are respectively different positions of the selector cam 420 and of the fellers 408, 409. FIG. 10 shows the position for the operating mode "addition." FIG. 11 shows the position "change" and "subtotal" or "total." FIG. 12 shows the position for entering the amount tendered by the customer.

Figure 13:
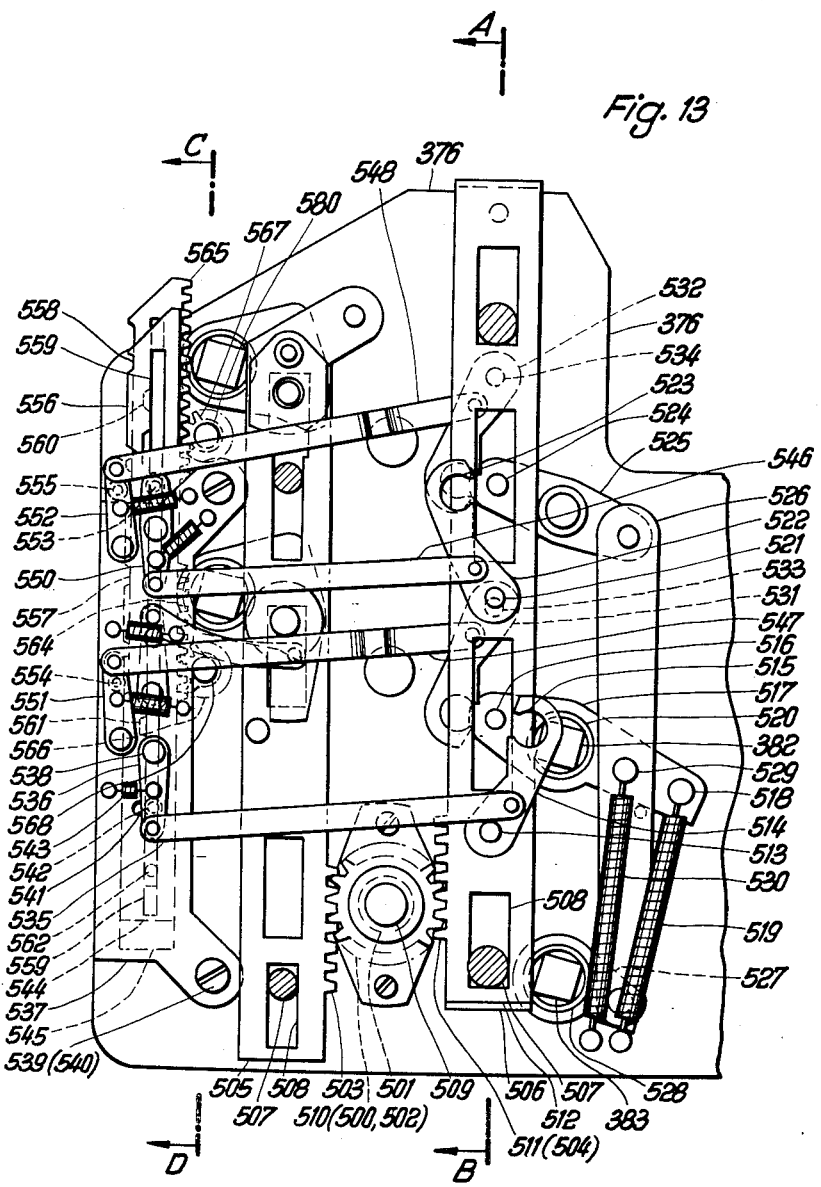
FIG. 13 is a side view of the computer-side selector device.

In the illustrated embodiment, as apparent from FIG. 8, the change computer or totalizer mechanism 386, 387 is designed as minus (subtracting) mechanism 386 and as plus (adding) mechanism 387. (Such an assembly of change-computing plus-minus mechanisms is known as such and is also illustrated and described in the above-mentioned application Serial No. 635,713 wherein FIG. 8 is substantially identical with FIG. 8 of the present disclosure.) The two component mechanisms are fastened on respective shafts 382 and 383 of square cross section, the two shafts being displaceably mounted in respective walls 375, 376 and 379 of the frame structure (FIGS. 8, 13).

In accordance with conventional totalizer or computing mechanisms of this type, each digit position in each of the add-sub mechanisms 386, 387 has a spur gear (positive counting gear) 390 assigned to positive values, and another spur gear (negative counting gear) 391 assigned to negative values, the negative gear 391 being differentially connected with the positive gear 390 by a differential gearing so that the entering of numerical values into the computing mechanism by means of the above-mentioned spur-gear segments 392 (FIGS. 8, 6), for the purpose of performing additions and subtractions, can occur only in the positive sense of rotation. However, for subtracting operation the particular minus or plus mechanism 386 or 387 must be axially displaced so that the negative counting gears 391, instead of the positive gears 390, enter into meshing engagement with the appertaining gear segments 392.

The device for thus displacing the computing mechanisms 386, 387 is designed as follows.

A stationary bearing block 393 is fastened by screw bolts between the side wall 300 and the intermediate wall 375 of the frame structure. Block 393 has two journal bores. One bore carries a pivot shaft 395 surrounded by a sleeve 394. Those ends of the sleeve 394 and of the shaft 395 that face away from the observer of FIG. 8, are riveted together with respective levers 397 and 398; and the other ends, facing toward the observer in FIG. 8, are provided with respective bearing members 400 and 401 for journalling respective control bridges 403 and 404. The second journal bore of bearing block 393 rotatably accommodates a pivot shaft 407 surrounded by a sleeve 406. The forward ends of sleeve 406 and shaft 407 are riveted together with the respective switching levers 412 and 413 each biased clockwise relative to FIG. 8 by a spring 410 or 411. The switching levers 412, 413 have respective bifurcated portions straddling and engaging respective projections 418, 419 of bridges 403 and 404. As mentioned, the switching levers 412 and 413 are connected with, and controlled by, the respective cam feelers 408 and 409 coacting with the stepped selector cam 420 for plus-minus selection (FIG. 7).

A latch lever 435 (FIG. 8) controlled by a cam (not illustrated) of the machine drive shaft 100, releases the switching levers 412, 413 at the beginning of the machine run so that the springs 410, 411 can turn the levers 412, 413 clockwise about their respective pivots 406, 407. As a result, the bridge structure 403, gliding on the bearing member 400 and controlled by the cam feeler 408, and the bridge structure 404 controlled by the feeler 409, are displaced relative to FIG. 8 until the feelers 408, 409 abut against the contour portion 421 of the plus-minus selector cam 420 displaced by the above-described actuation of the keys in banks 3 and 4.

The bridge structure 403 cooperates with a lateral dog pin 431 of a control shaft 430. The bridge 404, located behind the bridge 403 (FIG. 8), cooperates with a control lever 432 which is fastened to the control shaft 430 and is driven from a control cam (not shown) on the machine main shaft 100. (This is also described in the above-mentioned application Serial No. 635,713 where, in FIG. 2, the just-mentioned cam follower is denoted by 436 and is controlled by cams 433, 434 on the main shaft 96.)

The lever 397, riveted together with sleeve 394 and journalled on pin 395, is connected with the control shaft 382 by a bearing block 437 (FIG. 8) secured to the square portion of control shaft 382 (FIGS. 8, 13). The lever 398 (FIG. 8), riveted together with pin 395, is linked by constrained sliding engagement with an intermediate lever 439 rotatably mounted on a bearing block 438 which is secured by screws to the intermediate wall 375. The intermediate lever 439 has a bifurcated portion straddling a pin of a bearing block 440 which is fastened on a square portion of control shaft 383 to transmit axial sliding motion thereto.

If, for example, the control shaft 430 (FIGS. 8, 13) is turned clockwise relative to FIG. 13 under control by the machine main shaft 100 as explained above, then the dog pin 431 (FIG. 8) riveted to control shaft 430 engages the bridge structure 403 (which FIG. 8 shows in rotated position) and moves the bridge structure counterclockwise about its pivot 394. Simultaneously, the bearing block 400 and the above-mentioned sleeve are effective to also turn the control lever 397 counterclockwise so that the control shaft 382 and thus the minus mechanism 386 are shifted toward the right into positive position.

The operation of the change computer, comprising the plus-minus mechanisms 387, 386 will be more fully understood from the following.

If the positive sides (counting gears) 390 of the add-sub mechanisms 387, 386 are taken in view (FIG. 8) then in the zero condition:

The minus mechanism 386 is in position_____ 9999.99
and
The plus mechanism 387 is in position_____ 0000.00 i.e., the minus mechanism 386 has advanced one numerical unit, (the so-called "fugitive unit"). This obviates otherwise necessary switching means. Since, as explained, both mechanisms are charged on the positive side (gears 390) for addition, and are both charged on the negative side (gears 391) for subtraction, genuine positive sums are always located on the positive side of the plus mechanism 387, whereas genuine negative amounts are always located on the negative side (391) of the minus mechanism 386.

The means for selecting and controlling the plus and minus mechanisms 386, 387 for the purpose of entering an amount and drawing a total or balance will be described presently.

The unit of the highest digit in the minus mechanism 386 (in the illustrated embodiment the negative counting gear 391 of the minus mechanism 386 shown in FIG. 8, upper right portion) is rigidly joined with a cam 442 which cooperates with a pin of an arm 445 rotatably mounted on the control shaft 382. A bridge 446 connects the arm 445 with a switching member 447 which is rotatably mounted on the control shaft 382 and has a projecting arm 448. The arm 448 acts upon the above-mentioned dog pin 260 of the angular lever 258 and hence also upon the stop control member 250 linked with lever 258 (FIG. 6).

As already described, the cams 240, 241 (FIG. 6) acting upon the swing levers 226 to 228, drive the square bolt 220 and the lever 223 connected therewith, thus turning the mode control shaft 225. The control shaft, acting through suitable transmission gears (not shown), transmits its angular adjusting movements to a spur gear 500 (FIGS. 6, 13, 14). The spur gear 500 is fastened on a tubular shaft 501 (FIG. 13) which is journalled in the side wall 376 of the frame structure and carries a pinion 502. The pinion 502 meshes with racks 503, 504 of respective mode-of-operation control sliders 505, 506 displaceably mounted on the side wall 376 by pin-and-slot connections 507, 508. Located coaxially within the tubular shaft 501 is a control shaft 509 (FIGS. 13, 14) in continuous driving engagement with the swing lever 226 (FIG. 6) through intermediate gears (not illustrated). The control shaft 509 carries a pinion 510 (FIGS. 13, 14) meshing with the rack portion 511 of a mode-control slider 512 which is likewise guided in the pin-and-slot guides 507, 508. The pinion 510 reciprocates the slider 512 during each machine run in the operating mode "addition." The drive of the control sliders 505 and 506 is dependent upon the angular adjustment of the square bolt 220 (FIG. 6), so that bars 505 and 506 are moved in accordance with the mode "addition," "subtotalizing," or "grand totalizing," depending upon the angular position of the bolt 220. Rotatably fastened on the front side of the mode-control slider 512 (FIG. 14) is a coupling lever 514 by means of a pivot pin 513. The coupling lever 514 has a bifurcated entrainer 515 (FIG. 13) which can be placed into engagement with a pin 516 of a control lever 517. The control lever 517, whose arm 518 is biased by a pull spring 519, is mounted on a sleeve 520 rotatably journalled on the side wall 376. The same sleeve 520 also forms a journal for the control shaft 382 which, as described, carries the minus mechanism 386 and is axially displaceable. Another coupling lever 522 is secured by a pivot pin 521 to the mode-control slider 512 at a point above the coupling lever 514. The lever 522 has an entrainer 523 which can be placed into engagement wtih a switching pin 524 of a control lever 525 journalled on the side wall 376. The control lever 525 is connected by a link 526 with the control lever 527 of the sleeve 528, which sleeve also receives the above-mentioned control shaft 383 for carrying and displacing the plus mechanism 387. Hung onto the pin 529 of the link 526 is a pull spring 530 whose other end is fastened to the side wall 376.

The mode-control slider 506, located beside the mode-control slider 512 (FIG. 13), carries on its side facing away from the side wall 376 (FIG. 14) two pivot pins 533, 534 engaged by respective coupling levers 531, 532 which cooperate with dog pins 516, 524 respectively (FIGS. 14, 13).

The coupling lever 514 is connected by a link 535 with a feeler lever 536 rotatable on a bearing pin 538 of a carrier plate 537 (FIG. 15). The plate 537 is fastened to the side wall 376 by screw bolts 539 and spacer sleeves 540. The carrier plate 537 (FIGS. 15, 13) has a contour hole 541 through which the feeler pin 542 of the feeler lever 536 can pass, the feeler lever 536 being biased by a pull spring 543 and controlled by control sliders 544, 545. In the same manner, the coupling levers 522, 531 and 532 are connected by respective links 546, 547, 548 with spring-biased feeler levers 550, 551, 552 respectively. The feeler pins 553, 554, 555 of respective feeler levers 550, 551, 552 are likewise controlled by the control sliders 544, 545. The controlling cam profiles of the control sliders 544, 545 (FIGS. 13, 15, 19, 20) have the shape of teeth so as to form recesses 547, 558 and projections 556 which also occur in the guide slot 559 (FIG. 13) as recesses 560, 561. The feeler pins 542, 553 to 555 of feeler levers 536, 550, 551, 552 cooperate with these toothed cam profiles.

The control sliders 544, 545 are displaceably mounted and guided and for this purpose have slots 559 engaged by guide pins 562, 563 (FIG. 15) fastened to the side wall 376. The control sliders 544, 545 have respective rack portions 564, 565 (FIGS. 13, 15, 19, 20) meshing with respective pinions 566, 567 (FIGS. 13, 15). The pinion 566 is fastened on a shaft 568 (FIG. 15) connected by a clutch (not illustrated) with the shaft 209, described above with reference to FIG. 6, which is driven from the transfer mechanism 131 of the mode-control key bank 3.

Figures 16, 17, 18:
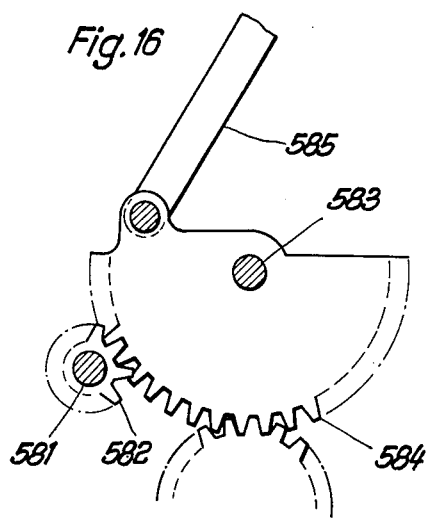
FIG. 16 shows a detail of the adding-mechanism selector device.
FIGS. 17 and 18 show respective examples of checks issued by the cash register.

The pinion 567 is fastened on a shaft 580 journalled in the side wall 376 and connected with a shaft 581 (FIGS. 15, 16). Fastened on shaft 581 is a pinion 582 (FIG. 16) meshing with a gear segment 584 rotatably mounted on a pivot pin 583. The gear segment 584 is connected by a linking rod 585 with the transfer mechanism 131 of the adding-mechanism selector bank 4 in the same manner as illustrated in FIG. 6 and described above relative to the linking rod 203.

The performance of the described machine is as follows:

Assume, for example, that a sale in the meat department, amounting to $0.99 is to be registered. Then the cashier or salesman first posts the amount of $0.99 into the amount key field 1 (FIG. 1). He then releases a machine run by depressing the "meat" key 12 in the adding-mechanism selector bank 4. The ensuing machine run enters the posted amount into the adding mechanism assigned to the meat department. As during such entering performance the transfer mechanism 131 assigned to the selector bank 4 commences to operate, the gear segment 584 (FIG. 16) turns clockwise, whereby the control slider 544 (FIGS. 13, 15, 20) is shifted by means of pinion 582, shafts 581, 580 and pinion 567. However, the control slider 545, being subject to control by another transfer mechanism 131, namely the one for the mode-control bank 3, remains in the original position shown in FIG. 13. The feeler pin 542 of feeler lever 536, biased by the pull spring 543, glides upon the cam contour of control slider 544 while the latter is being shifted in the above-described manner. As a result, the feeler pin 544 can drop into one of the recesses 561, depending upon the position which the transfer mechanism 131 reaches under control by the selected key 12. During this operation, the feeler lever 536 pulls, by means of link 535, the coupling lever 514 counterclockwise, relative to FIG. 13, about the pivot 513 of the coupling lever 514. The pivotal motion of coupling lever 514 continues until the bifurcated entrainer 515 straddles the switching pin 516 of the control lever 517. Now the mode-control slider 512 is in coupled connection with the control shaft 382 and hence with the minus mechanism 386 connected with the latter shaft. In the same manner the plus mechanism 387 is coupled in by means of feeler lever 550, link 546, coupling lever 522, control pin 524, control lever 525, link 526, lever 527, sleeve 528, and the control shaft 383 carrying the plus mechanism 387.

At the beginning of the same machine run, the switching levers 412, 413 are released by the latch lever 435 and are caused by their respective springs 410, 411 to turn the feelers 408, 409 into feeling engagement with the plus-minus selector cam 420 then in its positive position (FIGS. 7, 8, 10). That is, the feeler levers 408, 409 move clockwise (FIG. 8) about their pivot pin 407 until they are stopped by the plus-minus selector cam 420. As a result, the bridge structure 403, displaceably mounted on bearing member 400, is shifted toward the right (FIG. 8) due to the action of the forked recess 416 in switching lever 412, so that bridge 403 enters into the active range of the dog pin 431 on control shaft 430.

During the continuing clockwise rotation of the machine main shaft 100 (FIGS. 3, 4, 6) the control shaft 430 (FIGS. 8, 13) is turned as already explained, so that by means of the likewise rotating pin 431, the bridge 403 is turned clockwise about pivot 395 together with the control lever 397 joined with the bridge 403. During this motion the bearing member 437 displaces the control shaft 382 with the minus mechanism 386 toward the right relative to FIG. 8. As a result, the positive counting gear 390 of the minus mechanism 386 enters into the meshing range of gear segment 392; while the plus mechanism mounted on control shaft 383 remains in the positive position of engagement shown in FIG. 8, in accordance with the position of the appertaining feeler 409.

Since during the above-described machine run, the transfer mechanism 131 of the mode-control bank 3 is prevented from operating, the latter transfer mechanism does not effect any angular displacement of the square bolt 220 according to FIG. 6. Consequently, the bolt 220 remains in the initial position. The swing lever 226 for the mode "addition," acting through the mode-control shaft 225, effects an upward and downward motion of the mode-control sliders 505 and 506 during the continuing machine run in the mode "addition." During this operation, the levers 517 and 527 turn the control shafts 382, 383 and thus swing the plus-minus mechanisms 387, 386, connected with the latter shafts, into meshing engagement with the respective gear segments 392. Consequently, the positive counting gears 390 of the plus mechanism 387 and the positive counting gears 390 of the minus mechanism 386 are thus placed into active meshing engagement.

When this engagement is accomplished, and still during the first portion of the machine run, the transfer mechanisms 131 of the amount key banks (FIG. 4), which scan the depressed amount keys 6 in each digit bank, transfer during their return motion the felt-off numerical values onto the gear segments 392 in the conventional manner, thus transmitting the numerical setting also into the counting gears 390 meshing with the gear segments 392.

It will be apparent from the foregoing that the amount of $0.99 posted into the machine, aside from being entered into the adding mechanism seleceted by the "meat" key 12, is also entered through the respective positive counting gears 390 into the minus mechanism 386 and into the plus mechanism 387 of the balance computer. Since the minus mechanism 386 in its zero condition occupies on the positive side the position 9999.99, the entering of the amount $0.99 causes a tens transfer in the highest digit, namely an advance from position "9" to position "0." As a result, the cam 442 in the highest digit position, cooperating with the pin 444 of the control lever 445 rotatably mounted on control shaft 382, turns the control lever 445 clockwise (FIG. 6). This causes the bridge structure 446 to also turn the control lever 447 clockwise so that the extension 448 abuts against the stop pin 260 of the angular lever 258. Thus, the lever 258 is turned clockwise about its pivot 208 relative to FIG. 6 and, acting through the link 257, turns the stop control member 250 about its pivot 251. This places the lug 252 into the path of the stop arm 165 in the transfer mechanism 131 of the mode-control bank 3.

Shortly before termination of the machine run, the latch lever 435 is lowered onto the switch levers 412, 413 (FIG. 8) and thus turns the feelers 408, 409, connected with the switch levers, out of the range of the plus-minus selector cam 420 in opposition to the bias of springs 410, 411.

The first amount-entering machine run is now completed, and the machine is ready for the posting of another amount-entering run. The amounts next to be registered are to be posted into the keyboard of the machine by the clerk in accordance with any further sales items, and they involve the same individual operations within the machine as exemplified and described in the foregoing.

The example of the salescheck shown in FIG. 17 exemplifies how a series of individual transactions is printed in the conventional manner, a corresponding print also appearing on the accounting tape in the machine. In the example of FIG. 17, a first sale in the meat department is followed by two sales in the grocery department. The check carries a further entry indicating the totalized amount (subtotal ST) of $3.84 to be paid by the customer. The check also indicates that an amount of $10.00 was tendered by the customer. The last line on the check indicates the amount of change (ultimate total or balance) $6.16 to be paid back to the customer.

After, in the example of FIG. 17, the clerk has posted and entered the three individual items of the transaction, he registers the subtotal, indicative of the amount to be paid by the customer, by actuating the subtotal (sum) key 7 in bank 3 (FIG. 2). Since the subtotal, composed of several positively entered items, namely $0.99 for meat, $2.50 for groceries, and $0.35 for further groceries, is a positive sum, the total amount to be paid by the customer is to be taken from the positive side (gear) 390 of the plus mechanism 387. Consequently, the adding mechanism (plus mechanism) 387 shown in FIG. 8 may remain in the illustrated position. When the key 7 is being depressed, the machine run is released in the conventional manner under control by the cam disc 79 (FIG. 3). As a result, the control slider 545 is displaced by the transfer mechanism 131 of the mode-control bank 3 through link 203 (FIG. 6), lever 204, link 205, gear segment 206, pinion 210, control shaft 209, control shaft 568, and pinion 566. Such displacement of control slider 545 continues until the feeler pin 555 of feeler lever 552, acting through link 548, places the coupling lever 532 of mode-control slider 506 into engagement with the pin 524 of control lever 525, and thus couples the control shaft 383 as well as the plus mechanism 387 with the mode-control slider 506.

Also due to depression of key 7 in bank 3, the slider 54 is moved downwardly relative to FIG. 9. The slider 54 acts through rod 426 upon the pin 51 of lever 50 which turns the control shaft 422 counterclockwise to an angular position at which the selector cam 420, connected with control shaft 422, occupies the position illustrated in FIG. 11. The means comprising elements 54, 131, 250 and 420 therefore perform a selecting operation relative to the selection of plus or minus totalizing as well as for selecting the mode of operation.

During release of the feelers 408, 409, occurring during the continuing machine run, the feelers move under the action of pull springs 410, 411 and switching levers 412, 413 to the position illustrated in FIG. 11. Then the positive counting gears 390 of the plus mechanism 387 (FIG. 8) are located opposite the respective gear segments 392.

During the starting interval of the transfer mechanism 131 for the mode-control bank 3, explained above, the nose 165a of the stop member 165 (FIG. 6) runs against the lug 252 of control member 250 and turns the gear segment 206 about its pivot 208. The gear 211, connected with gear segment 206, turns the control segment 213 which acts upon the feeler roller 214 of the feeler lever 216. The feeler lever 216, acting through link 218, then shifts the square bolt 220 to the center position 230 according to FIG. 6. In this position, the mode-control shaft 225, and the mode-control slider 506 are moved during machine operation in accordance with the mode "subtotal," such motion being effected by means of the swing lever 227 which is placed into meshing engagement by the square bolt 220. In this mode, the coupled-in plus mechanism 387 (FIG. 6) is first turned counterclockwise about its pivot 383 until the positive counting gears 390 mesh with the gear segments 392. The gear segments 392, controlled by the transfer mechanisms 131 of the amount key banks 5, set the positive counting gears 390 of the plus mechanism 387 to zero during the initial operation of the transfer mechanisms and simultaneously effect setting the indicating mechanism 314 to the drawn-off values, so that the clerk as well as the customer can read off the computed total of sales. During the return motion of the gear segments, these values are again transferred back to the positive counting gears of the plus mechanism 387.

Referring to the numerical example represented by FIG. 17, the subtotal now indicated by the machine is $3.84, this being the amount to be paid by the customer. If the customer tenders a check or bill in the value of $10.00 (FIG. 17), the clerk posts this amount into the amount keys 6 and releases another machine run by depressing the "Pay" key 11 in bank 4. This amount must be entered in the negative sense for the purpose of determining the difference between the payable amount and the amount tendered. Accordingly, the release of the machine run by means of key 11 has the effect of causing the key slider 32 in bank 4 to set the plus-minus selector cam 420 to the position illustrated in FIG. 12. In this position of cam 420, the feelers 408, 409 abut against the cam recess 424a according to FIGS. 7 and 12, and the switching levers 412, 413 (FIG. 8) operate to shift the minus mechanism 386 and the plus mechanism 387 to the minus positions in which only the negative counting gears 391 can cooperate with the gear segments 392.

The coupling of the minus mechanism 386 as well as of the plus mechanism 387 is effected by means of the transfer mechanism 131 for the adding-mechanism selector bank 4 (FIG. 6). This transfer mechanism displaces the control slider 544 whereby the feeler levers 536 and 550, acting through links 535 and 546, place the coupling levers 514, 522 into engagement with the respective pins 516, 524. During the continued machine run, in which the mode-control slider 512 is being moved in the rhythm of the mode "addition," the plus mechanism 387 and the minus mechanism 386 turn into meshing engagement with the gear segments 392 and thus enter on their negative sides the values taken from the selectively depressed amount keys 6 by the respective transfer mechanisms 131 assigned to these key banks.

When the posted amounts are being entered into the minus mechanism 386, relating to the above-given numerical example, there again occurs a tens transfer in the highest digit 391 of the minus mechanism 386. After the subtotal is drawn in the above-described manner:

The positive side of minus mechanism 386 is in position 000383,

The negative side of minus mechanism 386 is in position 999616.

After the tendered amount of $10.00 is negatively entered as described above:

The positive side of minus mechanism 386 is in position 999383,

The negative side of minus mechanism 386 is in position 000616.

It will be realized that during the latter operation, the cam disc 442 for the highest digit has been turned back to the position shown in FIG. 6 so that the control levers 445, 447 turn clockwise and the extension 448 passes out of the active range of pin 260 on angular lever 258. As a result, the control member 250 is turned back by pull spring 256 to the position shown in FIG. 6.

After the amount tendered by the customer is entered by the machine run just described, the clerk can determine the amount of change to be paid back to the customer, by releasing another machine run. This is done by depressing the same sum (subtotal) key 7 previously used for registering the amount due from the customer. This has the effect that the slider 54 according to FIG. 9 is moved downwardly. The slider 54, acting through rod 426 and lever 50, displaces the control shaft 422 and the selector disc 420 connected therewith. The selector disc 420 then passes to the position shown in FIG. 11. The transfer mechanism 131 of the mode-control bank 3 simultaneously commences operating and places its stop arm 165 against the shank 31 of the depressed control key 7. During such motion of the transfer mechanism 131, the gear segment 206 is angularly displaced. Acting through the pinion 210 and the shaft 209, the segment 206 thus turns the shaft 568 (FIG. 15) with pinion 566. The pinion 566 adjusts the slider 545. Due to the action of feeler levers 551, 550 and links 547, 546, the coupling levers 531, 522 for the minus mechanism 386 and the plus mechanism 387 are placed in active position. Under control by the selector disc 420, acting upon the feelers 408, 409, the switching levers 412, 413 are turned clockwise about their pivot 407 due to the biasing force of their respective springs 410, 411. As a result, the control lever 413 turns the bridge 404 into the action range of pin 431 on control shaft 430. While the control shaft 430 is being driven from the main shaft 100, the control pin 431 turns the bridge 404 and the control lever 398 connected therewith, as well as the intermediate lever 439, to the position shown in FIG. 8. As a result, the positive counting gear 390 of the plus mechanism 387 enters into the meshing range of the gear segments 392, whereas the minus mechanism 386 remains in the position shown in FIG. 8.

The already coupled mode-control slider 506, which during this machine run is being moved in the rhythm of the mode "total" (grand total), causes the minus mechanism 386 to become actively engaged with the gear segments 392. Consequently, a genuine negative sum, namely the amount of change, being $6.16 in the above-mentioned example, is drawn from the negative counting gears 391 by means of the gear segments 392. In accordance with the arrangement of the mode-control slider 512 which, as mentioned, is being continuously moved during the machine run in the mode "addition" and which is coupled with the plus mechanism 387, the sum drawn out of the minus mechanism 386 is transferred during the return motion of the gear segments 392 into the plus mechanism 387 in the positive sense. As a result, the minus mechanism on its negative side, as well as the plus mechanism on its positive side, are reset to zero. Consequently the minus mechanism on its positive side 390 again occupies the position 999.99, and the plus mechanism on its positive side 390 occupies the position 000.00.

As already explained, when the first amount of $0.99 is being entered, there occurs a tens transfer in the highest digit unit of the minus mechanism 386, and the cam disc 442 (FIG. 6) places the control member 250 into the path of the stop arm 165 in the transfer mechanism 131 for the mode-control bank. Since, when the subtotal in the amount of $3.85 is drawn by depressing the sum 7 (FIGS. 2, 6), the transfer mechanism 131 is stopped in the position determined by the lug 252 of control member 250, and since according to FIG. 17 the printing type "ST" is assigned to this particular position, a corresponding designation is printed upon the check.

As soon as the amount tendered by the customer has been entered by depression of the "Pay" key 11 in the adding-mechanism selector bank 4, and after a new tens transfer in the highest digit of the minus mechanism 386 has taken place and the control member 250 has reached the position shown in FIG. 6, the stop arm 165 can advance up to the height of the shank 31 of key 7. The printing type "Ch" assigned to this position is likewise apparent from the check illustrated in FIG. 17.

The amount of $6.16 appearing in the indicating device 314 (FIG. 4, or 2c in FIG. 1) is identical with the amount of change to be paid back to the customer. As explained, all amounts entered into the machine as well as the total of the individual transactions and the final balance indicative of the amount of change are printed upon the register tape in the machine and on the customer's check according to FIG. 17.

If the customer tenders an amount identical with the one to be paid, the transaction can be performed in exactly the same manner as described above, namely by depressing the "Pay" key 11 and the "Sum" key 7. It is then necessary, however, to also post into the amount field 5 of the keyboard the amount tendered by the customer.

In order to eliminate the posting of the amount tendered in such cases, and in accordance with another feature of the invention, an additional key 8 (FIGS. 2, 6) can be provided in the mode-control bank 3. In this case, the key 8 serves for drawing subtotals, and the key 7 for drawing ultimate or grand totals. When drawing subtotals by depressing the key 8, the appertaining transfer mechanism 131 commences operating and places its stop arm 165 against the shank of key 8. The gear segment 206 and the pinions 210 and 566, then being angularly displaced, cause a displacement of the control slider 545 which couples the plus mechanism 387 with the mode-control slider 506 by means of feeler lever 552, link 548, and coupling lever 532. The control segment 213 (FIG. 6) is so designed that, when in this position, it displaces the square bolt 220 to the mid-position 230 where the swing lever 227 is coupled with the mode-control shaft 225 which, during the machine run, drives the reciprocating mode-control slider 506 in the rhythm of the mode "subtotal." Since the amount of the subtotal is taken from the positive side 390 of the plus mechanism 387, no displacement of this mechanism takes place, so that the selector disc 420, biased by the spring 423, remains in the position shown in FIG. 10.

Now, if the customer pays exactly the amount of the subtotal shown on the indicating portion 314 (FIG. 4, or 2c in FIG. 1) of the machine, the machine operation can be terminated directly by depressing the key 7. During this operation, the stop arm 165 on the transfer mechanism 131 of the mode-control bank 3 abuts against the lug 252 of the control member 250 which was displaced during the first amount-entering machine run. In this position, the plus mechanism 261 is actively coupled with the mode-control slider 506 by control slider 545, feeler member 552, link 548, and coupling lever 532; whereas the minus mechanism 386 is coupled with the mode-control slider 512 under the action of control slider 545, feeler lever 536, link 535, and coupling lever 514. Simultaneously, slider 54 (FIG. 9), linking rod 426, lever 50, and control shaft 422 effect a displacement of the selector disc 420 to the position (FIG. 11) in which the feeler 409 in the plus position, and the feeler 408 in the minus position enter into engagement with the selector cam 420. In this position, the minus mechanism 386 is shifted to the extent required to permit the negative counting gears 391 to enter into meshing engagement with the gear segments 392.

In this embodiment, the control segment 213 displaced by the gear segment 206, is so designed that, when segment 213 is in such displaced position, it turns the square bolt 220 to the ultimate-total position 229 where the swing lever 228 is connected with the mode-control shaft 225 which moves the mode-control slider 506 during the machine run in the rhythm of the mode "total" (ultimate total). During the same machine run, however, the minus mechanism 360, coupled with the mode-control slider 512, moves in the rhythm of the mode "addition." In the course of this machine run, the positive counting gears 390 of the plus mechanism 387 are reset to zero, and the values being then drawn from the plus mechanism are transferred to the negative counting gears 391 of the minus mechanism 386 then being moved in the mode "addition." In consequence, the positive counting gears of the minus mechanism 386 are again returned to the starting position. Finally, therefore, the positive counting gears 390 of the plus mechanism 387 are in position 000.00, and the positive counting gears 390 of the minus mechanism 386 are in the position 999.99. The check to be issued by the machine and to be given to the customer may contain the designations illustrated in FIG. 18.

However, when the amount tendered by the customer is in excess of the amount due, as registered by the machine, the amount of change can be computed by actuation of the "Change" key 11 in the same manner as already described. Since, during this first operation, the occurrence of another tens transfer in the highest digit of the minus mechanism 386 places the stop control member 250 to the position shown in FIG. 6, the stop arm 165 in the transfer mechanism 131 of the mode-control bank 3 can abut against the shank 31 of key 7 depressed for computing the amount of change. This operation is identical with the one already described with reference to the example of FIG. 17.

The modified embodiment illustrated in FIGS. 21 to 30 generally operates in the same manner as the machine described above, but affords a simplification of the keyboard assembly and of the controlling components of the machine. In general, the appearance of the machine according to FIGS. 21 to 30 is as shown in FIG. 1, except for the modification of the keyboard illustrated in FIG. 21; and the main components of the machine are likewise substantially as described above, so that it will be sufficient to hereinafter describe only the modified features.

As in the embodiment already described, the keyboard field 1a (FIG. 21) comprises a mode-control bank 3, an adding-mechanism selector bank 4, and several digital banks 5 of amount key 6. The adder selector bank 4 comprises selector keys 10, 12. The mode-control bank 3, departing from the keyboard assembly previously described in this specification as well as from the keyboard assemblies of known machines, comprises a particular control key 17 as well as a "blind" key 16.

The amount keys 6 (FIG. 22) in each digit bank of amount keys act with their respective cross-pins 13 upon the conventional arresting and zero-pawl sliders (not illustrated because conventional or as shown in FIGS. 10 and 11 of Serial No. 67,438, F-22816), which are biased by respective pull springs. The key pins 13 further act upon sloping projections 35 of an amount-key slider 36 which is guided in pin-and-slot connections 22, 23 and whose upper extension 37 has a pin 38 cooperating with a lug 39 of a control member 40 seated on a release control shaft 77.

The control member 40 (FIGS. 23, 24, 25) extends above the amount-key banks 5 up to the height of the mode-key bank 3 and is provided with slots 41, 42. During assembling of the machine the slots 41, 42 serve for inserting the clearing shaft 77. The same slots also serve, during conventional machine clearing operation, to permit the clearing shaft 77 and the pins 78 connected therewith to perform relative motion with respect to the control member 40. On the right-hand side of the control member 40, relative to FIG. 23, there is mounted another lug 43 which acts upon a pin 44 (FIG. 26) of a control slider 45 guided in the assembly of the mode-control bank 3 by means of pin-slot connections 22, 23. Riveted to the left-hand lower lug of the control slider 45 is a pin 47 (FIGS. 26, 27) to cooperate with a stop 48 (FIG. 27) of a control slider 49 which is likewise guided in the pin-slot connections 22, 23 of the mode-key bank 3.

The control slider 49 has a downwardly extending cam slot 55 engaged by the cross pin 56 of the blind key 16 which is laterally guided by guide sheets 58 (FIG. 27). The control slider 49 further has a sloping cam lobe 59 which can cooperate with the cross pin 14 of the control key 17, depending upon the adjustment of the control slider 49. In FIG. 7, the control slider 49 is shown in the starting position. During actuation of the control key 17 the slider remains in its position previously occupied. A stop 60 on control slider 49 acts upon a pin 61 of a slider 62 (FIG. 28) which is likewise located in the assembly of the mode-control bank 3 and which serves for selecting the plus or minus sides of the add-sub mechanism already described. The sliders 36, 45, 49 and 62 are biased by respective pull springs (not shown) which return the individual sliders to the starting positions shown in FIGS.

22, 26, 27, 28 at the termination of each individual machine run.

The slider 62 has a sloping cam projection 63 (FIG. 28) engageable by the cross pin 14 of the control key 17. Pivotally secured to the slider 62 is one end of a linking rod 64 whose other end is joined by a pivot pin 51 (FIG. 29) with a lever 50 fastened on the control shaft 422. The above-described plus-minus selector cam 420 is clamped upon the control shaft 422 and biased by a pull spring 423 attached to the pivot pin 51. The selector cam 420 has an arcuate cam contour 424 which merges with a contour portion 424a closer to the cam axis than the contour 424. The selector disc 420 is checked by the above-described feelers 408, 409 at the beginning of the machine run. As also explained, the feelers 408, 409 are connected with the switching levers 412, 413 biased by respective pull springs 410, 411. As described in conjunction with the preceding embodiment, the levers 412, 413 displace the add-sub mechanism 387, 386 for selection of the plus or minus side.

Journalled on a pin 251 (FIG. 28) fastened to the assembly of key bank 3, is a stop control member 250 whose portion 252 cooperates with the stop arm 165 of the transfer mechanism described above in conjunction with the first embodiment, mainly with reference to FIG. 5. Riveted to arm 254 of member 250 is a pin 255 engaged by a pull spring 256 and a linking rod 257. The linking rod 257 is in connection with the above-described control means that are controlled by the add-sub mechanism 386, 387. The linking rod 257 thus places the member 250 into or out of the action path of the stop arm 165 in dependence upon the setting of the add-sub mechanism 386, 387. The stop arm 165 is further controllable by the shanks 65, 66 of blind key 16 and control key 17 respectively.

Pivotally connected with the pin 201 of the gear segment 167 in the transfer mechanism 131 is the linking rod 203 which is in operative connection with the mode-of-operation control device already described in conjunction with the preceding embodiment.

The operation of the modified embodiment according to FIGS. 21 to 30 will be described presently with reference to the example of a business transaction indicated on the customer's check shown in FIG. 30 and substantially identical with the one described above with reference to FIG. 17.

The customer purchases goods from the meat department in an amount of $0.99, and makes two purchases in the grocery department amounting to $2.50 and $0.35 respectively. These amounts are posted into the amount keyboard of the machine as described above, and are then entered and registered by actuating the proper adding-mechanism selector keys 10, 12. During the entering runs, the machine is controlled in the rhythm of the mode "addition." The selector disc 420 remains in the position shown in FIG. 29 (corresponding to "addition" machine runs), and the add-sub mechanism 386, 387 causes the control member 250 to turn to the position shown in FIG. 28.

After the individual items are posted and entered, the clerk actuates the control key 17 which releases the subtotalizing machine run. The cross pin 14 of control key 17 acts upon the sloping projection 63 of slider 62 and moves it to the right relative to FIG. 28. This causes the link 64 to turn the selector cam 420 (FIG. 29) about its pivot 422 to such a position that at the beginning of the machine run the feelers 408 and 409, previously lifted off the cam contour 424, are released and enter into feeling contact with the contours 424, 424a of the selector disc 420. With such positioning, and after the stop arm 165 abuts against the stop control member 250, a subtotal is drawn with the cooperation of the transfer mechanism 131 in the manner already described above. During such subtotalizing operation, the positive counting gears of the add-sub mechanisms 386, 387 are placed in mesh with the gear segments 392 at the beginning of the machine run. The subtotalized amount of $3.84 is drawn and is transferred in the printer upon the check 68 (FIG. 30) and appears in the indicator of the machine. Prior to termination of the machine run, the same amount is again entered into the positive side of the add-sub mechanism 386, 387.

If now the customer tenders a bill in the amount of $10.00, this amount is posted by means of the amount keys 6 and is then registered by releasing a machine run. This is done by depressing the same control key 17 that was previously actuated for drawing the subtotal.

When thus actuating one of the amount keys 6 whose cross pin 13 acts upon the sloping projections 35 of the amount-key slider 36, the slider is shifted toward the right relative to FIG. 22. The pin 38 then presses upon the projection 39 of the control member 40 whose extension 43 shifts the control slider 45 at pin 44 likewise toward the right relative to FIG. 26. The pin 47, fastened to the projection 46 of the control slider 45, then acts upon the stop 48 of the control slider 49 and displaces the slider 49 in the same direction so that the sloping projection 59 becomes located beneath the cross pin 14 of the control key 17.

Consequently, when the control key 17 is being depressed, the sloping projection 59 causes the control slider 49 to shift toward the right relative to FIG. 27, whereby the key pin 56 guided in the cam slot 55 depresses the blind key 16 toward the interior, relative to FIG. 27. Thus the shank 65 of blind key 16 enters into the path of the stop arm 165 in the transfer mechanism 131. Simultaneously, the stop 60 displaces the slider 62 by means of the pin 61 a greater extent toward the right than was previously effected by the action of cross pin 14 of control key 17 upon the projection 63 of slider 62.

In the ultimate position reached by the slider 62, the selector cam 420 (FIG. 29) is angularly adjusted to a position where the two feelers 408, 409 can abut against the inner cam contour 424a during the starting interval of the machine run. This has the effect that the negative sides of the add-sub mechanisms 386, 387 are placed into meshing engagement for transfer of values. The stop arm 165 of transfer mechanism 131, abutting against the key shank 65 and acting through link 203, selects the mode-control means for operating in the mode "addition" in which the posted values are entered into the negative counting gears of the add-sub mechanism 386, 387. During suc hnegative entering of the amount tendered by the customer, the counting gears of the add-sub mechanism 386, 387, previously controlled in the positive sense, shift the stop control member 250 (FIG. 28) out of the path of the stop arm 165 when the counting gears pass through the zero positions. Consequently, during the subsequent machine run for computing the amount of change, initiated by depression of the same control key 17, the advancing stop arm 165 abuts against the shank 66 of the control key 17 itself. In this position, the slider 62 is displaced only by the amount determined by the slope 63, while, exactly as during the drawing of the subtotal, the selector cam 420 is displaced to such an extent that the feeler 409 can abut against the cam contour 424 and the feeler 408 against the contour 424a. During this operation, the add-sub mechanism 386, 387 is being displaced so that the genuine negative sum in the amount of $6.16 is drawn from the negative side of the add-sub mechanism 386, 387 during the machine run occurring in the rhythm of the "totalizing" mode, and that thereafter the counting gears are reset to starting positions prior to termination of the machine run.

It will be recognized from the foregoing that the stop arm 165 of the transfer mechanism 131 may assume three different positions, to which the arm is set in dependence upon the particular mode control performed by the transfer mechanism 131 of the mode-control bank 3, and by the control sliders 45, 49 or 62 which are actuated under control by the depressed amount keys as well as under control by the stop control member 250 which is shifted by the balance-computing mechanism. In accordance with these three selected positions of the stop arm 165, the transfer mechanism adjusts the indicating and printing devices of the machine in the manner and by the means described with reference to the cash register of FIGS. 1 to 20.

The essential features of the invention embodied in the machine described with reference to FIGS. 21 to 30, namely the release of adding as well as subtotalizing and totalizing machine runs by means of a single control key, is not limited to change-computing cash registers, but is analogously applicable to other cash registers as well as to accounting, calculating or the like machines in which similar sequential machine runs are to be performed.

It will be obvious to those skilled in the art, upon studying this disclosure, that my invention permits of a variety of modifications with respect to individual components and their particular interconnections, and hence can be given embodiments other than particularly illustrated and described herein, without departing from the essential features of my invention and within the scope of the claims annexed hereto.

I claim:

1. A change-computing business machine, comprising a keyboard assembly having selectively actuable amount-posting keys and selectively actuable machine-run control keys, said machine-run control keys including keys for entering positive amounts and a payment-received key for entering negative amounts, add-sub totalizer means selectively operable in additive and subtractive sense, differential means operably engageable by said amount-posting keys for actuating said totalizer means and selectively controllable by said control keys for entering respective additive and subtractive amounts posted by said amount-posting keys, said totalizer means comprising change-computing mechanisms for forming the amount of change as the difference between entered additive amounts and an entered subtractive amount, said machine-run control keys including one and the same balance-drawing key for controlling said totalizer means to perform a subtotalizing operation and to perform a change-computing operation respectively, and selecting control means operatively connecting said balance-drawing key with said totalizer means for causing said computer means to selectively effect adding and subtracting runs depending upon previous actuation of a positive-entering and a negative-entering control key respectively.

2. A change-computing business machine, comprising a keyboard assembly having selectively actuable amount-posting keys and selectively actuable machine-run control keys, said control keys comprising single-item entering keys, a balance-drawing key for item-totalizing machine runs, and a payment-received key; an add-sub totalizer assembly; differential means first connecting said amount-posting keys with said totalizer in the additive sense and secondly connecting said amount-posting keys with said totalizer in the subtractive sense, the second connection being under control of said payment-received key; and selecting control means operatively connecting said balance-drawing key with said computer assembly under control of the said other control keys for causing said computer assembly to selectively perform adding and subtracting runs, said subtracting runs being controlled only by said payment-received key, whereby the balance-drawing control key effects a subtotalizing run upon registering of at least one single item but effects a change-computing run upon actuation of said payment-received key.

3. In a change-computing business machine according to claim 1, said add-sub totalizer means comprising amount-entering gears angularly adjustable under control by said amount-posting keys and comprising intercoupled add-sub mechanisms selectively engageable with said gears in additive and subtractive relation thereto; and said selecting control means having a positionally adjustable control member (250) in operative connection with said mechanisms so as to be displaced in dependence upon additive and subtractive positions respectively of said mechanisms, and transmission means coactively connecting said control member (250) with said balance-drawing key (7) whereby said latter key selectively releases a subtotalizing run and a change-computing balance-drawing run respectively depending upon whether said payment-received key (11) is actuated.

4. In a business machine according to claim 3, said totalizer means comprising a plus mechanism and a minus mechanism differentially related to each other for joint operation and having respective input means selectively engageable with one of said amount-entering gears, each of said plus and minus mechanisms having a multiplicity of digital units, said plus mechanism being normally set to zero and said minus mechanism being normally set to highest value position in all of its digital units so as to perform a tens transfer in its highest digital unit when any amount is entered into said plus mechanism; said minus mechanism having in its highest digital unit a cam member (442) movable from a normal position due to said tens transfer, said cam member forming part of said transmission means so as to control the position of said control member (250) in dependence upon the setting of said highest digit position in said sub mechanism.

5. A business machine according to claim 4, comprising a mode-control key bank in which said balance-drawing key is located, a transfer mechanism disposed at said bank and having a stop member (165) displaceable along a given path during each machine run released by a key in said bank, said control member (250) being displaceable to a position in said path so as to stop the displacing motion of said stop member, the displacement of said control member being controlled by entering an amount.

6. In a business machine according to claim 5, said transmission means connecting said cam member (442) with said control member (250) so as to move it out of said path when the amount entered by said payment-received key is at least equal to the sum additively entered into said plus mechanism.

7. A business machine according to claim 2, comprising printer control means operatively connected with said add-sub totalizer assembly for differently identifying the printed amounts differently drawn from the computer assembly by actuation of said same balance-drawing key (7).

8. A business machine according to claim 3, comprising printer control means for differently identifying the printed amounts differently drawn from the totalizer assembly by actuation of said same balance-drawing key (7), said printer control means being operatively connected to said balance-drawing key (7) and said control member (250) to be controlled thereby.

9. In a business machine according to claim 2, said control keys comprising a subtotal key for adding multiple items, said balance-drawing key being actuable upon subtotalizing for releasing a terminating machine run independently of said payment-received key, and said control means having control members (544, 545) for shifting said add-sub computer assembly to adding and subtracting operations respectively under control by said control keys and in dependence upon which of said control keys is actuated to release a terminating machine run.

10. In a business machine according to claim 2, said selecting control means comprising a selector cam (420) and biasing means for normally holding said cam in a given starting position, cam feeler means (408, 409) and transmission means connecting said cam with said totalizer assembly for shifting the latter between adding and subtracting positions in accordance with displacement of said selector cam from said position, and transmission means connecting said cam with said payment-received key and said balance-drawing key.

11. A change-computing business machine, comprising a keyboard assembly having amount-posting keys and selectively actuable mode-of-operation control keys, said control keys comprising a balance-drawing key (7) for releasing a terminating machine run, a subtotal key (8) for adding multiple items, keys (10, 12) for entering positive amounts, and a payment-received key for entering negative amounts, said control keys permitting the machine operations to be terminated selectively by change computation and by totalization without change computation respectively, add-sub totalizer means selectively operable in additive and subtractive sense, differential means operably engageable by said amount-posting keys for actuating said totalizer means and selectively controllable by said control keys for entering respective additive and subtractive amounts posted by said amount-posting keys, the entering of subtractive amounts being controlled by said payment-received key, said totalizer means comprising change-computing mechanisms for forming the amount of change as the difference between entered additive amounts and an entered subtractive amount, and selecting control means operatively connecting said balance-drawing key, payment-received key and subtotal key with said computer means for causing said totalizer means to selectively effect adding and subtracting runs depending upon previous actuation of one of said subtotal key and payment-received key respectively.

12. A change-computing business machine, comprising a keyboard assembly having amount-posting keys and selectively actuable mode-of-operation control keys, said control keys comprising one and the same main key for entering posted amounts and for drawing subtotals and ultimate totals, a computer assembly, differential means operatively connected with said amount-posting keys for transferring posted amounts to said totalizer assembly, and sequence control means under control by said control keys and connected with said totalizer assembly for controlling the latter to enter a posted amount and to draw a subtotal and an ultimate total respectively in a given sequence of actuation of said main key.

13. A change-computing business machine, comprising a keyboard assembly having amount-posting keys and selectively actuable mode-of-operation control keys, said control keys comprising one and the same main key for drawing a subtotal and entering a posted amount and drawing the ultimate balance, add-sub totalizer means selectively operable in additive and subtractive sense, differential means operatively connecting said amount-posting keys with said totalizer means and selectively controllable by said control keys for entering respective additive and subtractive amounts posted by said amount-posting keys, said totalizer means comprising change-computing mechanisms for forming the amount of change as the difference between entered additive amounts and an entered subtractive amount, and selecting control means operatively connecting said main key with said totalizer means and having a sequencing mechanism which under control by first actuation of said main key causes said totalizer assembly to form a subtotal and by next actuation of said same key causes a posted amount to be subtractively entered into said assembly, and by third actuation causes drawing of the balance.

14. A business machine according to claim 13, comprising printer control means for identifying the printed amounts differently drawn from said add-sub totalizer means by actuation of the same main key, said printer control means having a displaceable control member whose position determines the identification, and transmission means operatively connecting said control member to said main key (17) whereby the position of said control member is dependent upon the sequence of actuation of said main key.

15. In a business machine according to claim 14, said control keys forming a key bank, a transfer mechanism correlated to said bank, said control member of said printer control means forming part of said differential mechanism and being displaceable on a given path along said bank, first stop means movable into said path for stopping said control member (165) in a given position of displacement, said first stop means comprising a blind key (16) controllable by said amount-posting keys, a second stop means (250) movable into said path for stopping said control member (165) in another position of displacement, said second stop means being connected with said totalizer means to be controlled thereby, and third stop means movable into said path to stop said control member (165) in still another position, said third stop means forming part of said main key (17).

16. In a business machine according to claim 15, said totalizer means comprising a plus mechanism and a minus mechanism differentially related to each other for joint operation, said selecting control means comprising a selector-cam mechanism (420, 408, 409) for displacing said mechanisms between adding and subtracting positions, a slider (52) connected with said cam mechanism for controlling it, said main key (17) having means (63) for directly adjusting said slider, and indirect adjusting means (49) coupled with said main key for indirectly adjusting said slider.

17. In a business machine according to claim 16, said indirect adjusting means comprising a control slider (49) preadjustable by said amount-posting keys, and another slider (62), said two sliders being actuable by said main key (17).

18. In a business machine according to claim 17, said control slider (49) being linked with said blind key (16) for moving the latter into said path of said control member.

19. In a business machine according to claim 18, said control slider (49) being actuable by said main key (17) only when said control slider is in a pre-set position controlled by said amount-posting keys (6, 36).

20. A business machine according to claim 19, comprising amount-key controlled pre-setting means for said control slider (49), said pre-setting means having a switching member (40) and having a key-bank slider (45) displaceable by said switching member and by said amount-posting keys.

References Cited in the file of this patent

UNITED STATES PATENTS

| | | |
|---|---|---|
| 2,853,232 | Goodbar et al. | Sept. 23, 1958 |
| 2,974,860 | Werner et al. | Mar. 14, 1961 |